United States Patent
Mudalige

(10) Patent No.: US 8,352,112 B2
(45) Date of Patent: Jan. 8, 2013

(54) AUTONOMOUS VEHICLE MANAGEMENT

(75) Inventor: Upali Priyantha Mudalige, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 484 days.

(21) Appl. No.: 12/749,699

(22) Filed: Mar. 30, 2010

(65) Prior Publication Data

US 2010/0256836 A1 Oct. 7, 2010

Related U.S. Application Data

(60) Provisional application No. 61/167,121, filed on Apr. 6, 2009.

(51) Int. Cl.
*G06F 19/00* (2006.01)
*G05D 1/00* (2006.01)

(52) U.S. Cl. .......... 701/24; 701/117; 701/300; 342/458; 342/457; 340/435

(58) Field of Classification Search ............ 701/24, 701/23, 25, 26, 2, 4, 117, 120, 300, 301; 342/455, 29, 458, 457; 340/961, 435, 436
See application file for complete search history.

(56) References Cited

U.S. PATENT DOCUMENTS

| | | | |
|---|---|---|---|
| 5,331,561 A * | 7/1994 | Barrett et al. | 701/23 |
| 6,963,795 B2 * | 11/2005 | Haissig et al. | 701/7 |
| 8,026,833 B2 * | 9/2011 | Villaume et al. | 340/961 |
| 2010/0256835 A1 * | 10/2010 | Mudalige | 701/2 |
| 2010/0256852 A1 * | 10/2010 | Mudalige | 701/24 |

* cited by examiner

*Primary Examiner* — Ronnie Mancho

(57) ABSTRACT

A method for controlling a vehicle upon a roadway includes monitoring a trajectory of a host vehicle based upon a global positioning device within the host vehicle, monitoring a first wireless communication between the host vehicle and a plurality of target vehicles, the first wireless communication including a respective trajectory of each of the target vehicles based upon a respective global positioning device within each of the target vehicles, determining navigational commands for the host vehicle based upon the trajectory of the host vehicle and the trajectory of each of the target vehicles, and operating the host vehicle based upon the navigational commands.

39 Claims, 20 Drawing Sheets

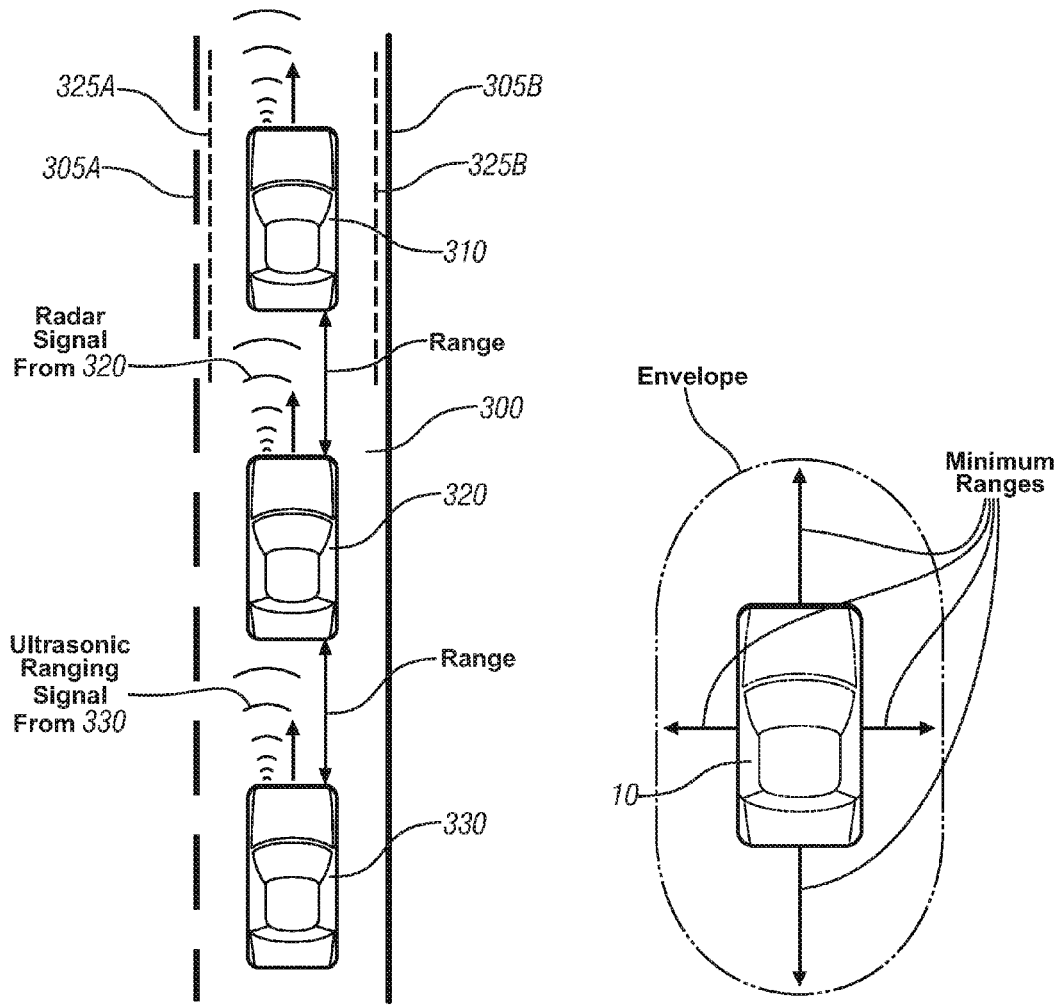
FIG. 12
FIG. 13
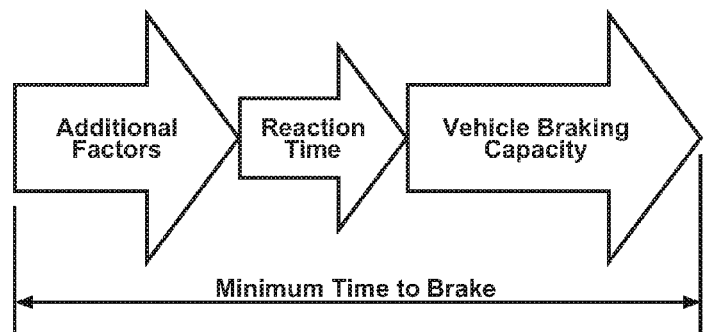
FIG. 14

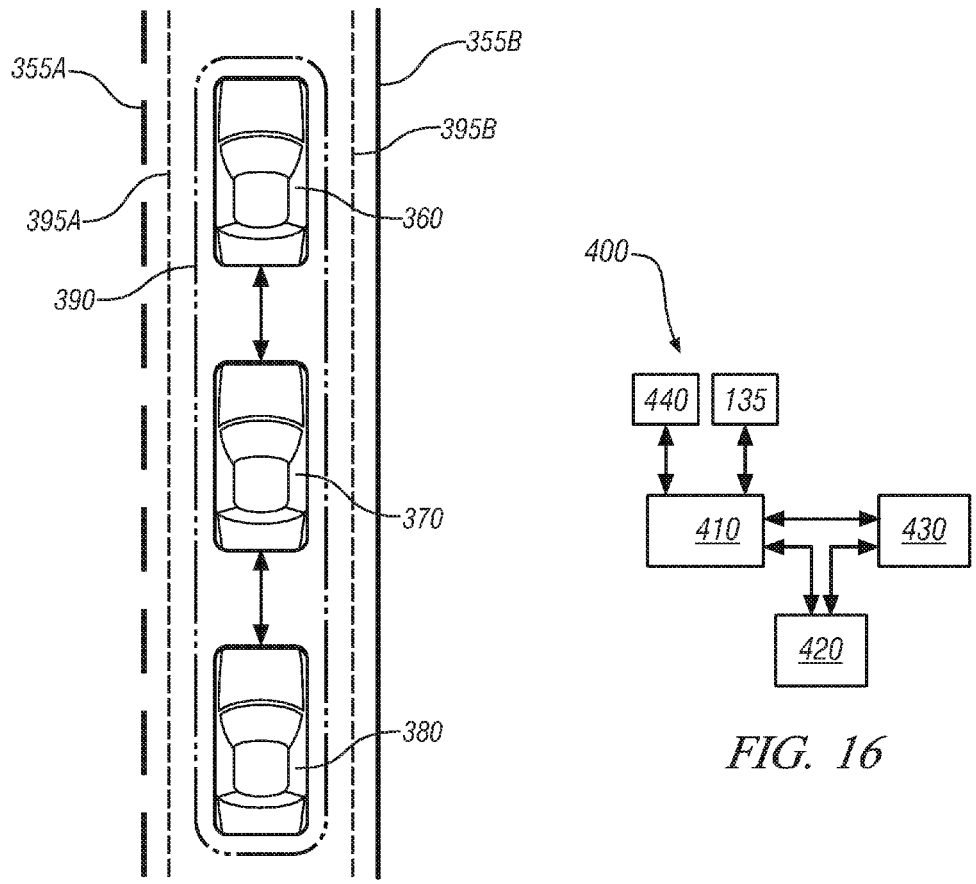
FIG. 15
FIG. 16
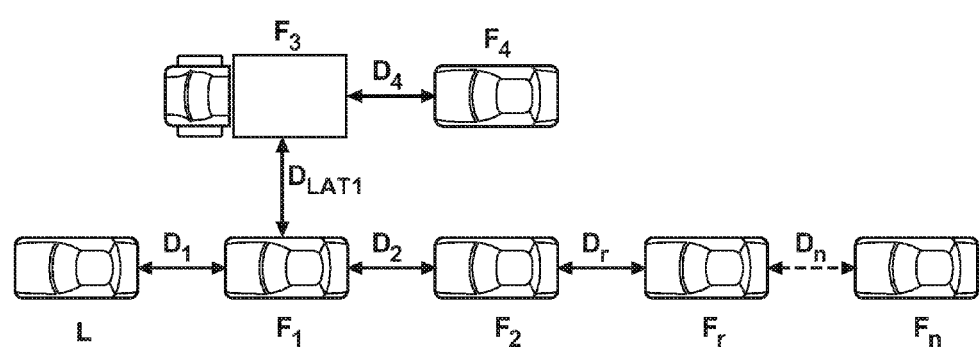
FIG. 17

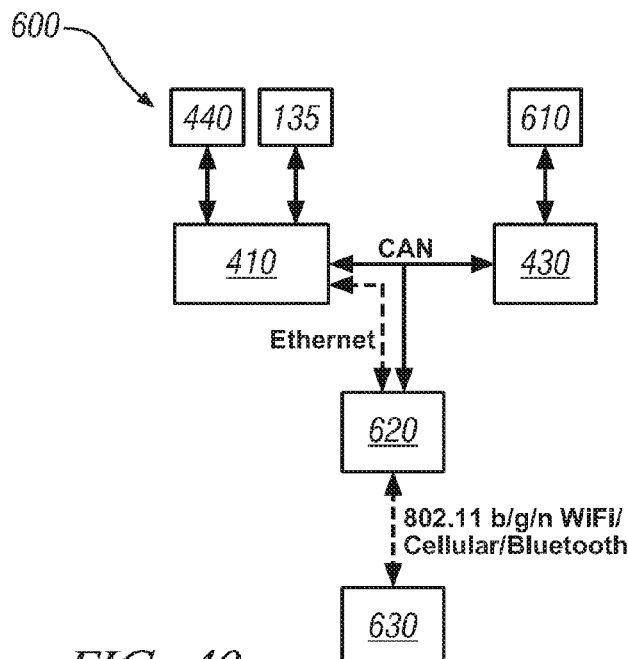

FIG. 40

| Field | Interpretation | Typical Use |
|---|---|---|
| Speed delta_1 | Change from the current Command Speed anticipated at a distance equal to (25%) of the Length of Speed Profile measured from the current location | Initial coasting or slight deceleration... if communications recovers, the motion will not be disruptive |
| Speed delta_2 | Change from the current Command Speed anticipated at a distance equal to (50%) of the Length of Speed Profile measured from the current location | Transition to significant slowing |
| Speed delta_3 | Change from the current Command Speed anticipated at a distance equal to (75%) of the Length of Speed Profile measured from the current location | Transition to significant slowing |
| Speed delta_4 | Change from the current Command Speed anticipated at a distance equal to (100%) of the Length of Speed Profile measured from the current location | Complete stop for fail-safe maneuver (which would be the inverse of the current Command Speed) |

FIG. 41

AUTONOMOUS VEHICLE MANAGEMENT

CROSS REFERENCE TO RELATED APPLICATIONS

This application claims the benefit of U.S. Provisional Application No. 61/167,121 filed on Apr. 6, 2009, which is incorporated herein by reference.

TECHNICAL FIELD

This disclosure is related to control of vehicles on a roadway.

BACKGROUND

The statements in this section merely provide background information related to the present disclosure and may not constitute prior art.

Vehicular travel in traffic and population dense urban areas requires significant driver attention. Maneuvering a vehicle in such areas requires driver attention to traffic flow, road conditions, signage, traffic signals and pedestrian traffic. The time spent in traffic reduces the time available to the driver for other personal and work related activities.

Autonomous or semi-autonomous control methods may include a vehicle equipped with devices capable of locating the vehicle to the road and to other traffic on the road and control methods are employed to augment or substitute driver control of the vehicle.

Employing vehicles optimized for urban settings in combination with control methods utilizing autonomous control is desirable.

SUMMARY

A method for controlling a vehicle upon a roadway includes monitoring a trajectory of a host vehicle based upon a global positioning device within the host vehicle, monitoring a first wireless communication between the host vehicle and a plurality of target vehicles, the first wireless communication including a respective trajectory of each of the target vehicles based upon a respective global positioning device within each of the target vehicles, determining navigational commands for the host vehicle based upon the trajectory of the host vehicle and the trajectory of each of the target vehicles, and operating the host vehicle based upon the navigational commands.

BRIEF DESCRIPTION OF THE DRAWINGS

One or more embodiments will now be described, by way of example, with reference to the accompanying drawings, in which:

FIG. 6 depicts an exemplary GPS coordinate monitored through a GPS device combined with 3D map data for the GPS coordinate;

FIG. 7 depicts identification of a lateral position as well as an angular orientation with respect to the lane;

FIG. 8 depicts and exemplary method to utilize a directional signal, such as a radio signal from a known source or a radar signal return, to localize the position of a vehicle;

FIG. 12 depicts vehicles utilizing exemplary methods to control vehicle operation, in accordance with the present disclosure;

FIG. 13 depicts an exemplary vehicle and a desirable envelope around the vehicle, in accordance with the present disclosure;

FIG. 14 describes one exemplary method to formulate a minimum desirable range in front of a vehicle, in accordance with the present disclosure;

FIG. 15 depicts operation of an exemplary platoon, in accordance with the present disclosure;

FIG. 16 schematically depicts an exemplary in-vehicle platooning control system, in accordance with the present disclosure;

FIG. 17 depicts an exemplary platoon formation, in accordance with the present disclosure;

FIG. 33 describes an exemplary reaction if the request is denied;

FIG. 34 describes an exemplary reaction if the request is granted;

FIG. 40 schematically depicts operation of an autonomous system architecture diagram, including operation of a remotely operated portable navigation device communicating commands to the vehicle control systems, in accordance with the present disclosure; and FIG. 41 depicts exemplary speed profile data that can be utilized in order to execute a slowing or stopping maneuver, in accordance with the present disclosure.

DETAILED DESCRIPTION

Figure 1:
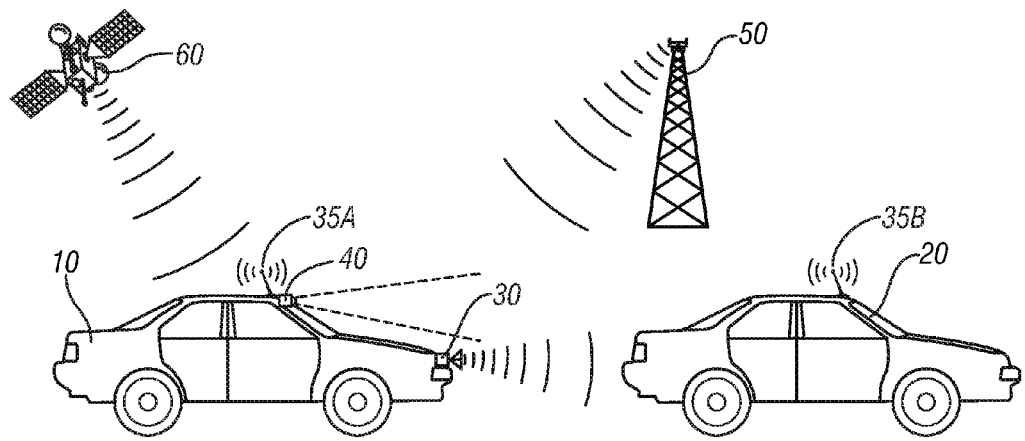
FIG. 1 illustrates an exemplary host vehicle in traffic with another vehicle, the host vehicle including a number of devices useful to control the host vehicle, in accordance with the present disclosure.

Referring now to the drawings, wherein the showings are for the purpose of illustrating certain exemplary embodiments only and not for the purpose of limiting the same, FIG. 1 illustrates an exemplary host vehicle in traffic with another vehicle, the host vehicle including a number of devices useful to control the host vehicle, in accordance with the present disclosure. Host vehicle 10 is traveling proximate to target vehicle 20. Host vehicle 10 may include exemplary sensor devices including a radar system 30 and a camera system 40. Additionally, host vehicle 10 receives signals from remote wireless communications system 50 and remote satellite system 60. V2X communications device 35A is depicted, enabling host vehicle 10 to communicate with infrastructure, for example, remote wireless communications system 50, or other vehicles. V2X communications device 35B is depicted upon target vehicle 20, enabling communication between target vehicle 20 and host vehicle 10 or V2V communication. V2X communication can be defined as short-range wireless communication between a vehicle and a remotely located communications device for the purpose of providing information regarding the operating environment around the vehicle. V2X communication includes V2V communication between two vehicles and V2I communication between a vehicle and a traffic infrastructure device or system. Host vehicle 10 monitors and processes available information from the aforementioned systems, including information on target vehicle 20, the road surface being driven upon, and other information available from the remote systems for the purpose of facilitating control of host vehicle 10.

Sensor data and other information can be used in various applications to implement autonomous or semi-autonomous control a vehicle. For example, adaptive cruise control (ACC) is known wherein a vehicle monitors a range to a target vehicle and controls vehicle speed in order to maintain a minimum range to the target vehicle. Lane keeping methods utilize available information to predict and respond to a vehicle unexpectedly crossing a lane boundary. Object tracking methods monitor objects in the operating environment of the vehicle, for example on a projected path in front of the vehicle, and facilitate reactions to the object tracks. Lateral vehicle control is known wherein information related to a projected clear path, lane keeping boundary, or potential for collision is utilized to steer the vehicle. Lateral vehicle control can be used to implement lane changes, and sensor data can be used to check the lane change for availability. Collision avoidance systems or collision preparation systems are known, wherein information is monitored and utilized to predict a likelihood of collision. Actions are taken in the event the predicted likelihood of collision exceeds a threshold. Many forms of autonomous and semi-autonomous control are known, and the disclosure is not intended to be limited to the particular exemplary embodiments described herein.

Figure 2:
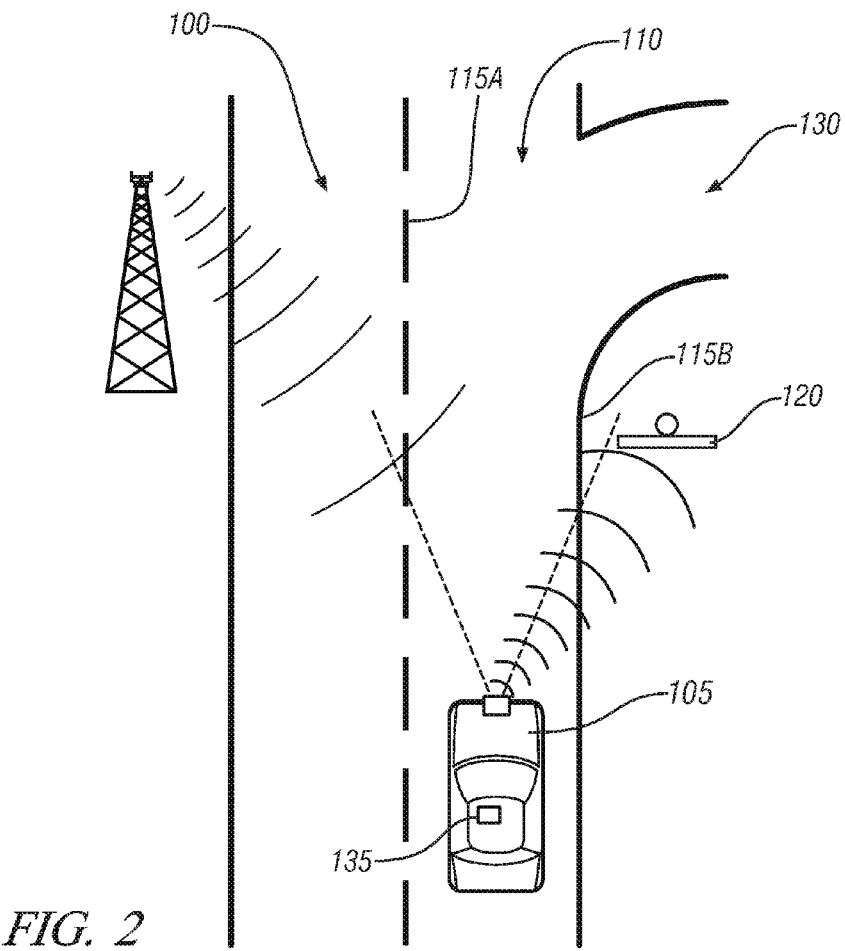
FIG. 2 illustrates an exemplary host vehicle on an stretch of road utilizing a number of different inputs that can be utilized to locate the vehicle, in accordance with the present disclosure.

Multiple sources of information can be utilized in coordination to control a host vehicle. FIG. 2 illustrates an exemplary host vehicle on a stretch of road utilizing a number of different inputs that can be utilized to locate (i.e. localize) the vehicle, in accordance with the present disclosure. Host vehicle 105 is traveling on road surface 100 in lane 110 defined by lane markers 115A and 115B. Host vehicle 105 is similar to vehicle 10 and additionally includes GPS device 135 in communication with a global positioning service enabling an estimation of current vehicle position with relation to a 3D map database calibrated to coordinates provided through GPS device 135. One having ordinary skill in the art will appreciate that information from the GPS device includes a GPS error. Known GPS systems provide a data stream of coordinates with a sample rate of approximately 1-20 Hz range. Host vehicle 105 additionally monitors radar and camera information according to methods described in FIG. 1. Additionally, a transmitter tower 125 is depicted. Information over a wireless network from such a transmitter tower can be used as information for host vehicle 105. Additionally, signals from transmitter tower 125, even if unrelated otherwise to the operation of vehicle 105, can be used to provide a locating angle to the known location of the tower. Such a known location can be determined according to reference information such as is contained in a 3D map database or can be located through repeated travel past a recognizable signal, for example, a radio signal transmitting at a particular AM frequency or FM band. Alternative signals in the frequencies of ISM band and/or DSRC (5.9 GHz) band can also be used for this purpose. Radar returns can be used to locate a vehicle. For example, sign post 120 is depicted. In methods similar to the methods described above to localize the vehicle location with respect to a transmitting tower, radar returns from the exemplary sign post 120 can be used to refine an estimate of vehicle location upon road surface 100. A camera view or analysis of camera images can likewise be utilized to localize the vehicle location. For example, camera images of sign post 120, lane markers 115A and 115B, or occurrence of an off-ramp 130 in combination with information regarding to location of these features with respect to road surface 100 allow for improved estimation of vehicle location upon road surface 100. Other exemplary methods to localize vehicle location upon a road surface are envisioned (for example, including LIDAR devices or ultrasonic devices), and the disclosure is not intended to be limited to the particular embodiments described herein.

Figure 3:
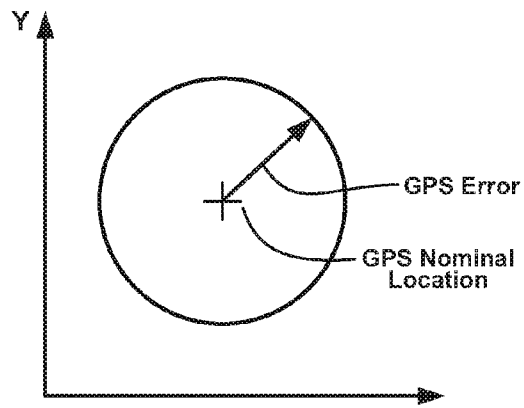
FIG. 3 depicts an exemplary GPS coordinate that is monitored by a GPS device, in accordance with the present disclosure.

FIG. 3 depicts an exemplary GPS coordinate that is monitored by a GPS device, in accordance with the present disclosure. A GPS device returns information from a remote satellite system describing a location of the GPS device according to a global coordinate system (latitude, longitude, altitude). The information returned can be described as a nominal location. However, as described above, GPS data is not precise and includes a GPS error. The actual location of the GPS device can be anywhere within an area defined by the nominal location and the GPS error. When calculating distance between vehicles using GPS position differencing, most GPS errors will cancel out for vehicles in close neighborhood (e.g., within 500 m) and accurate relative distances can often be obtained.

Figure 4:
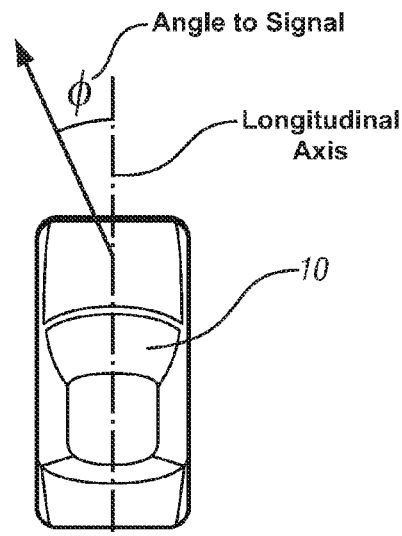
FIG. 4 depicts an exemplary determination of an angle to a signal with respect to the longitudinal axis of the vehicle, in accordance with the present disclosure.

FIG. 4 depicts an exemplary determination of an angle to a signal with respect to the longitudinal axis of the vehicle, in accordance with the present disclosure. Signals received by vehicle 10 can include radar signals returned from detected objects or signals monitored from independent transmitters, such as radio or wireless towers. As described in FIG. 4, analysis of received signals can provide an angle of the signal from the longitudinal axis of the vehicle ($\theta$). Some signals, such as radar returns, can additionally provide a range to a target object from which the signal was returned.

Figure 5:
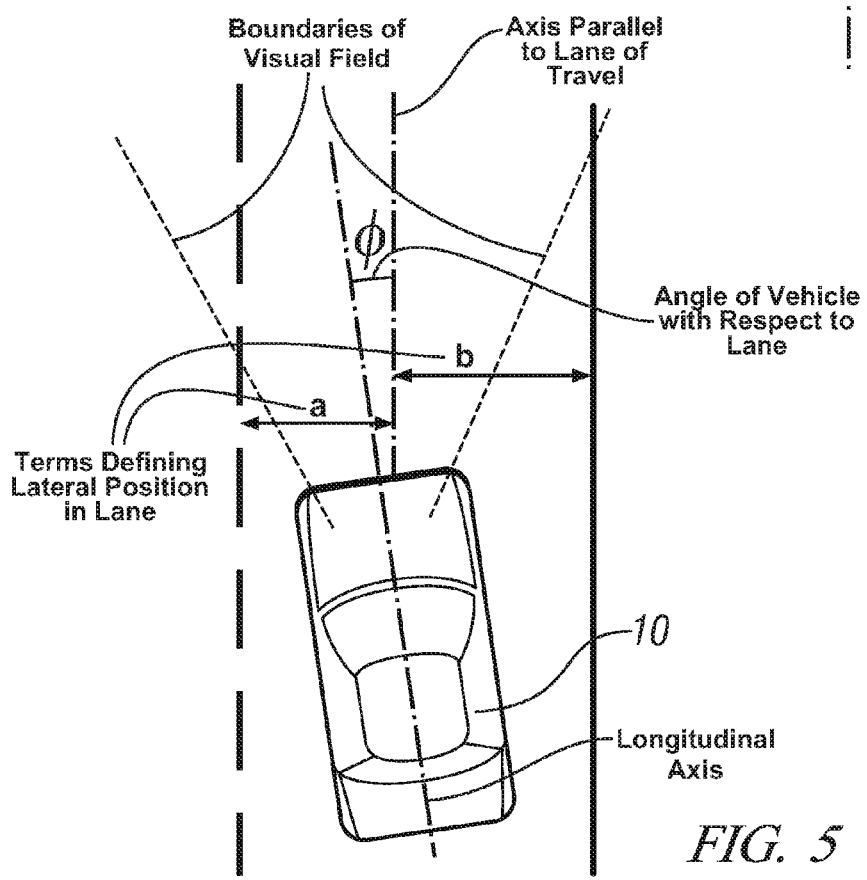
FIG. 5 depicts exemplary analysis of a vehicle's lateral position and angular orientation with respect to a lane of traffic based upon camera information, in accordance with the present disclosure.

FIG. 5 depicts exemplary analysis of a vehicle's lateral position and angular orientation with respect to a lane of traffic based upon camera information, in accordance with the present disclosure. Vehicle 10 is depicted including camera device 40 traveling upon lane 110. A visual field can be described by an area that is represented in a visual image. As will be appreciated and as depicted in FIG. 5, boundaries of a visual field that can be analyzed through a visual image can be described as an angular area extending outward from the camera capturing the image. By utilizing image recognition methods, lane markers, road features, landmarks, other vehicles on the road, or other recognizable images can be utilized to estimate a vehicle position and orientation with respect to lane 110. From analysis of visual images, a lateral position within lane 110 can be estimated, for example, according to distances a and b from the lane markers. Similarly, orientation of vehicle 10 within the lane can be estimated and described as angle cp.

Figure 6:
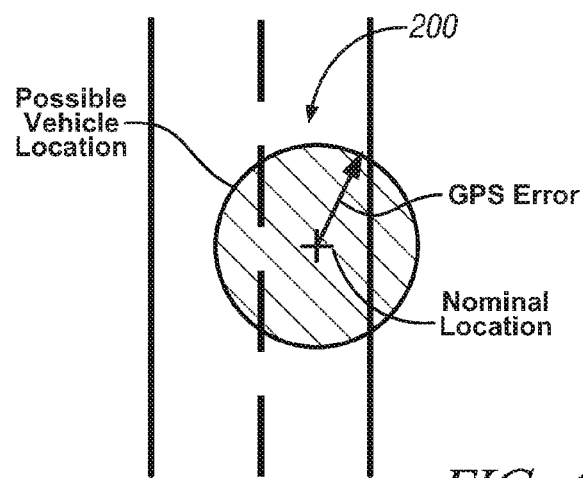
FIGS. 6-8 demonstrate an exemplary method to determine a location of a vehicle, in accordance with the present disclosure.
Figure 7:
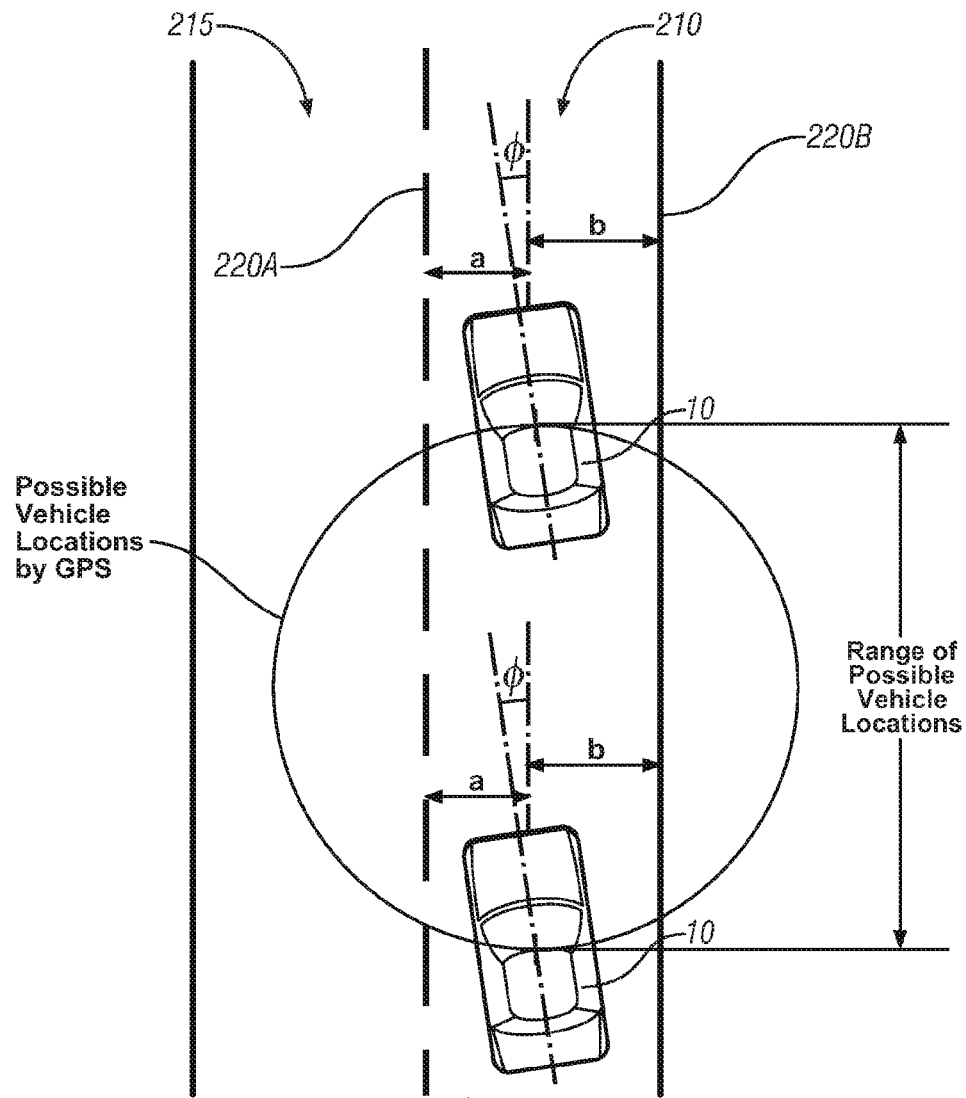
Figure 8:
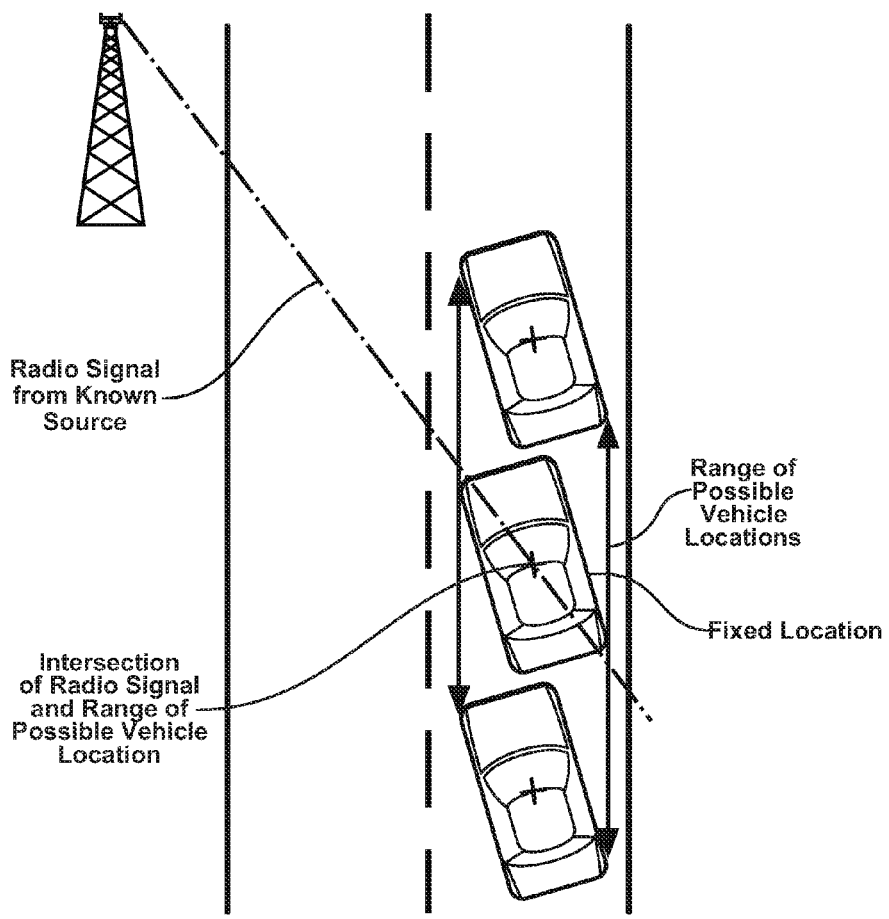

Information that is monitored within a vehicle can be used to determine a location of the vehicle with respect to 3D map data. FIGS. 6-8 demonstrate an exemplary method to determine a location of a vehicle, in accordance with the present disclosure. GPS data can be utilized in coordination with 3D map data to approximate a location of a vehicle with respect to a road surface. FIG. 6 depicts an exemplary GPS coordinate monitored through a GPS device combined with 3D map data for the GPS coordinate. As depicted in FIG. 3, a nominal location identified through a GPS device can be used to describe an area wherein the device can be located. In FIG. 6, the nominal location combined with GPS error yields an area wherein the GPS device in the vehicle can be located or an area of possible vehicle locations. The coordinate of the nominal location can be coordinated with corresponding coordinates in 3D map data, and the area of possible vehicle locations can be projected onto a map.

Within the area of possible vehicle locations made possible by monitoring GPS data, other information can be utilized to localize the location of the vehicle within the area of possible vehicle locations described in FIG. 6. For example, image recognition methods can be utilized as described in FIG. 5 to identify features on the road in front of the vehicle. FIG. 7 depicts identification of a lateral position as well as an angular orientation with respect to the lane. This information can be used to place the vehicle within the area of possible vehicle locations. Further, lane markers can be examined, for example, utilizing a dotted line versus a solid line to identify a lane of travel from possible lanes of travel within the possible vehicle locations. Additionally, any recognizable features identified within the camera data can be used to fix a location. Recognizable features that can be identified and used in conjunction with a 3D map database to determine location include occurrence of an intersection, an off-ramp or on-ramp, encountering a bridge or overpass, approaching an identifiable building, or any other similar details contained within the 3D map data.

Methods utilized in FIG. 7 can sufficiently locate the vehicle or may designate a range of locations or alternate locations where the vehicle might be located. FIG. 8 depicts and exemplary method to utilize a directional signal, such as a radio signal from a known source or a radar signal return, to localize the position of a vehicle. In the exemplary determination made in FIG. 7, a range of possible vehicle locations has been determined A directional signal from the radio tower depicted allows an intersection between the range of positions within the lane determined in FIG. 7 and the direction to the radio tower to determine a fixed location of the vehicle. In this way, a combination of information sources can be utilized to determine a fixed location of a vehicle with reasonable accuracy.

The method depicted in FIG. 8 is one exemplary method to fix a location of a vehicle, refining an approximate location originating from a GPS coordinate and a digital map database, first with visual data or radar data and then with a radio or other wireless directional signal. It will be appreciated that a number of methods to localize the position of a vehicle can be utilized equally to fix the location of the vehicle to enable the methods described herein. For example, in combination with a GPS signal, visual data, or radar data in combination with digital map information, a plurality of radio, radar, or similar signals originating from known sources can be utilized to localize a position of a vehicle. In another example, a local communications network could contain a local correction factor specific to that geographic location to correct position determined by GPS coordinates. The disclosure is not intended to be limited to the particular examples described herein.

FIGS. 6-8 demonstrate one exemplary method to fix a location of a vehicle. One having ordinary skill in the art will appreciate that a number of methods are known to fix or triangulate the position of a vehicle. For example, radar returns or radio returns from two known objects can be used to triangulate position of a vehicle on a map. Once a position is fixed at some instant in time, another method could determine an estimated change in position of the vehicle by estimating motion of the vehicle, for example, assuming travel along a present road based upon a monitored vehicle speed, through use of a gyroscopic or accelerometer device, or based upon determining a GPS error margin by comparing the last fixed location to the GPS nominal position at that instant and assuming the GPS error margin to be similar for some period. One having ordinary skill in the art will appreciate that many such exemplary methods are known, and the disclosure is not intended to be limited to the exemplary methods described herein. Further, an exemplary infrastructure device includes a GPS differential device, for example, that can be located along roads, communicate with passing vehicles, and provide a GPS offset value to the vehicles for a localized area. In such a known device, a GPS nominal location for the device is compared to a fixed, known position for the device, and the difference yields a GPS offset value that can be utilized by vehicles operating in the area. Through use of such a device, sensor readings and calculations to triangulate a location of a host vehicle are unnecessary.

Using methods to determine a location of a Leader Vehicle and coordinate a number of vehicles based upon the operation of the Leader Vehicle can be of great advantage to streamlining travel within a densely populated or urban area.

Figure 9:
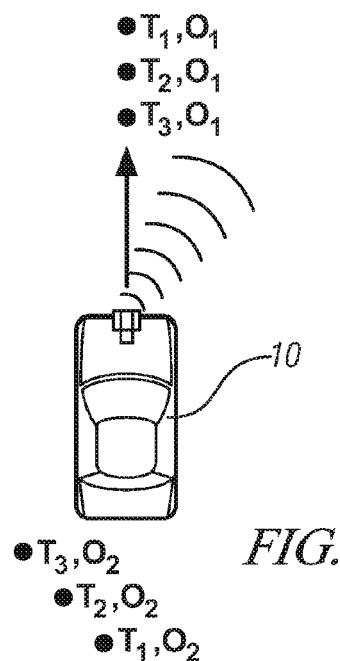
FIG. 9 depicts exemplary target track information, in accordance with the present disclosure.

Object tracking is a method whereby a host vehicle utilizes information such as radar returns to determine sequential relative positions of a target object to the host vehicle. FIG. 9 depicts exemplary target track information, in accordance with the present disclosure. Positions for a first object, $O_1$, and a second object, $O_2$, are described at sequential times $T_1$-$T_3$. The three plotted positions of object $O_1$ describe an object getting sequentially closer to the host vehicle. Such a track can be utilized in a number of ways by the host vehicle, for example, by comparing a range to $O_1$ to a minimum allowable range or by determining a likelihood of collision between $O_1$ and the host vehicle.

Figure 10:
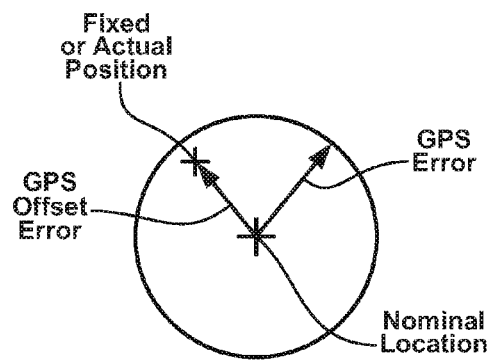
FIG. 10 depicts information from a GPS device, including a nominal position, a GPS error margin, and a determined actual position defining a GPS offset error, in accordance with the present disclosure.

FIG. 10 depicts information from a GPS device, including a nominal position, a GPS error margin, and a determined actual position defining a GPS offset error, in accordance with the present disclosure. As described above, a nominal position is monitored through a GPS device. Based upon error inherent in GPS technology, some inaccuracy in the GPS determination is inherent to the nominal location, creating a range of possible positions in relation to the nominal position. By methods such as the exemplary methods described above, an actual or fixed location of the GPS device can be determined. By comparing the actual or fixed location of the GPS device to the nominal position, a GPS offset error can be calculated as a vector offset from the nominal position.

Errors in sensing devices can be randomly offset in a changing directions and distances, with scattered results indicating poor precision; or errors can be consistently offset in a particular direction and distance, with tightly grouped results indicating good precision. On having skill in the art of GPS devices will appreciate that error in a GPS device tends to exhibit good precision, with iterative results in an area and in close time intervals exhibiting closely grouped results with similar GPS error offsets. Similarly, multiple devices operating in a close proximity to each other and monitoring nominal position information at substantially the same time tend to experience similar GPS error offsets.

Figure 11:
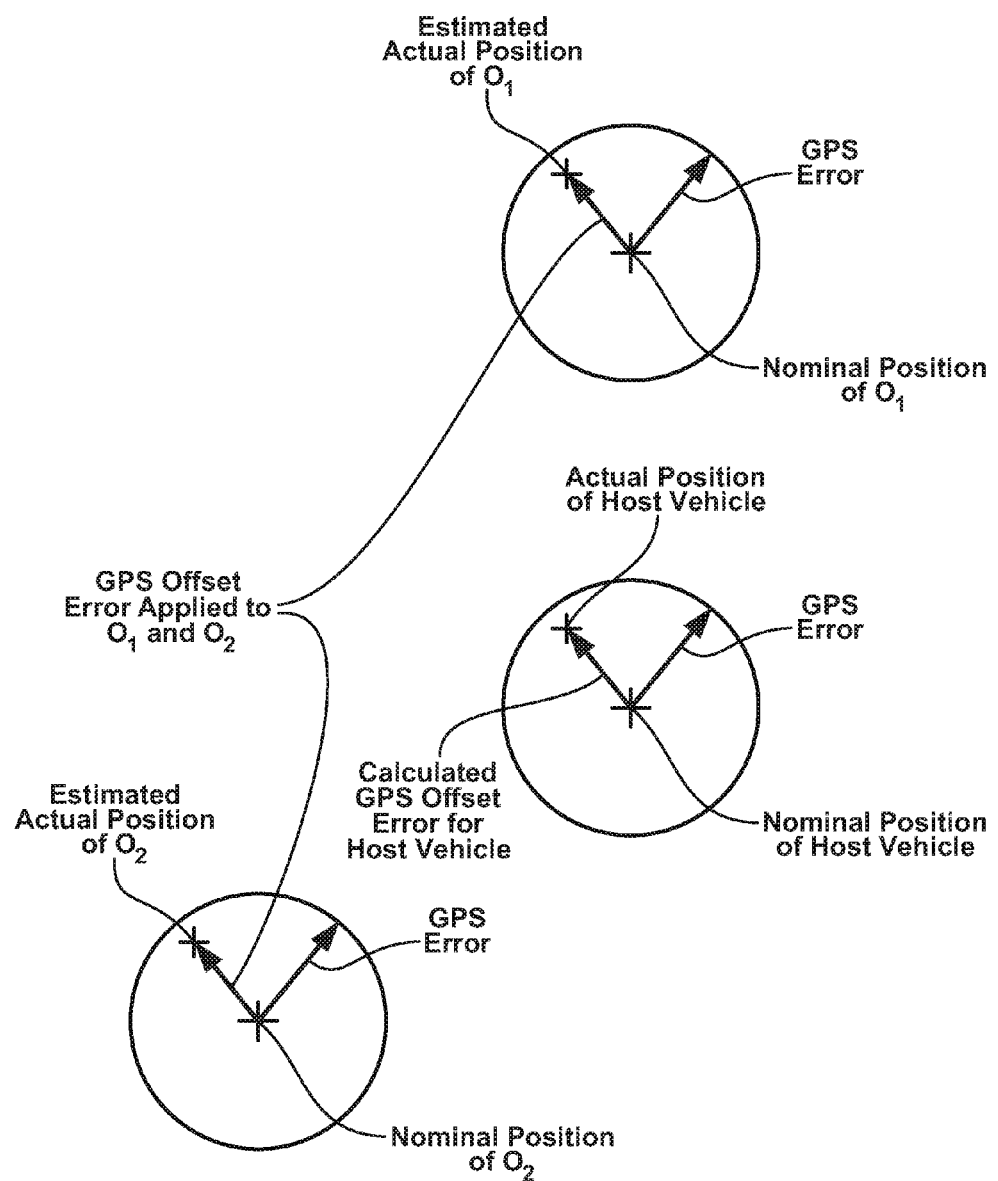
FIG. 11 depicts a host vehicle and two target objects, all monitoring GPS nominal positions, and resulting GPS offset errors, in accordance with the present disclosure.

FIG. 11 depicts a host vehicle and two target objects, all monitoring GPS nominal positions, and resulting GPS offset errors, in accordance with the present disclosure. As described above, GPS offset errors tend in multiple objects monitoring nominal positions at the same time tend to exhibit the same or similar GPS offset errors. Nominal positions for the host vehicle and for target objects $O_1$ and $O_2$ are described, for example, describing each of the nominal positions as if three GPS devices were present, one in the host vehicle and one in each of the target objects. An actual position of the host vehicle is determined, and a GPS offset error can be determined for the host vehicle. Based upon the tendency of GPS devices to provide information with good precision and based upon an accurate estimation of the actual location of the host vehicle, correlation of the three nominal locations provides an ability to determine indicated actual positions for $O_1$ and $O_2$ with high accuracy.

Methods are known to utilize information regarding the driving environment around a vehicle to control autonomously or semi-autonomously the relative location of the vehicle with respect to a lane and with respect to other vehicles. FIG. 12 depicts vehicles utilizing exemplary methods to control vehicle operation, in accordance with the present disclosure. Vehicle 310, vehicle 320, and vehicle 330 are traveling in lane 300 defined by lane markers 305A and 305B. Vehicle 320 is utilizing a radar signal to determine a range to vehicle 310, useful, for example, in an ACC application, and vehicle 320 is additionally utilizing known methods to establish an estimated position within the lane and determine lane keeping boundaries 325A and 325B. Vehicle 330 is similarly monitoring a range to vehicle 320, in this exemplary case, through use of an ultrasonic signal. Vehicle 330 can be operated manually, for example, with the operator steering the vehicle and utilizing range information to maintain a desirable following distance behind vehicle 320.

A unitary vehicle moves according to its own direction, and does not attempt to coordinate its motion with other vehicles. A formation is a special arrangement of two or more vehicles that travel together in a coordinated way. The general pattern of a formation will be consistent over extended periods of time (based on navigation goals and situations), but the specific details of the pattern may be adjusted on a moment-to-moment basis based on external factors and driving situation. At certain points in time, due to external factors or human intervention, a new formation may be enacted. Each vehicle in the prior formation will be assigned a unique position in the new formation. As conditions allow, each vehicle would maneuver into the proper place in the formation geometry.

Platooning is a method to control a group of vehicles wherein a single control scheme is used to control the group of vehicles in a formation. The single control scheme can be determined in a single Leader Vehicle. Platooning allows the vehicles to achieve a number of beneficial results, including increased fuel efficiency, collision risk mitigation, freeing the driver to focus attention away from the road, increased efficiency in urban traffic density and control, and other benefits.

Each vehicle participating in the formation assumes one (and no more than one) position in the formation at a time. One position designated as leader position carries special requirements on a vehicle assuming that position, establishing a special role for that vehicle. One or more additional follower positions may be defined within the formation. The "smoothed" position of the Leader Vehicle along its trajectory defines the origin and orientation of formation space, which moves and changes orientation relative to the ground as the formation traverses from one location to another.

Figure 18:
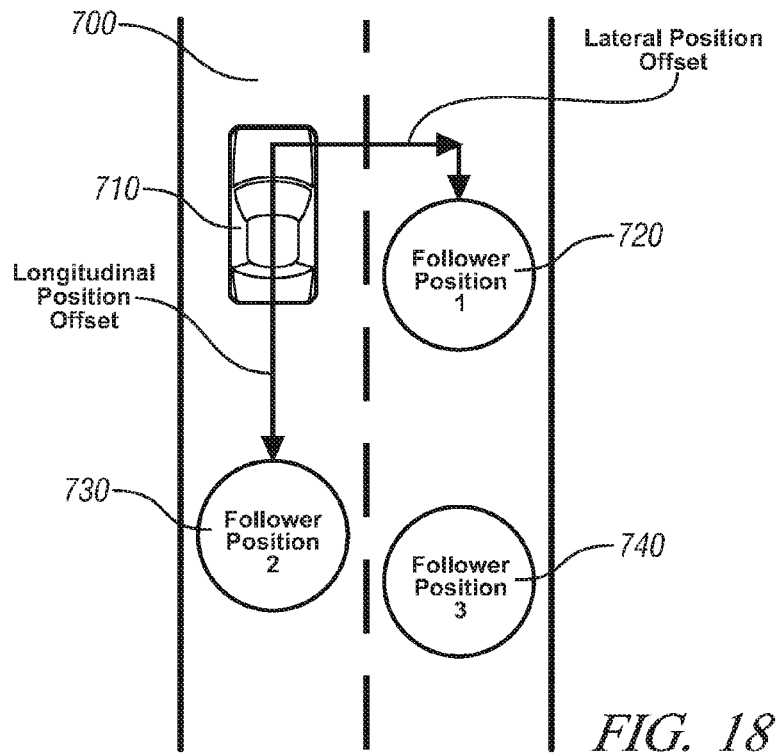
FIG. 18 depicts exemplary platoon roles and defined positions, in accordance with the present disclosure.

FIG. 18 depicts exemplary platoon roles and defined positions, in accordance with the present disclosure. Leader Vehicle 710 is depicted situated upon road 700. Follower positions 1, 2, and 3 are depicted as circles defining position envelopes 720, 730, and 740, in which vehicles may be situated, and are defined in relation to the position of the Leader Vehicle. A lateral position offset is depicted, describing a lateral distance from the Leader Vehicle that a vehicle in a side-by-side formation position can be defined. This lateral offset is set by a number of factors, including lane geometry, vehicle type, and goals or priorities of the platoon. A longitudinal position offset is also depicted describing a longitudinal distance from the Leader Vehicle that a vehicle in an in-line vehicle position can be defined. This longitudinal offset is set by a number of factors and is defined in detail throughout this disclosure. Position can be used to describe the actual or commanded location of the vehicle. Additionally, a defined position within the platoon or a follower position within the platoon can be used to describe a station or a desired spot within the platoon that a vehicle should be guided to. Follower positions within a platoon can be defined in a number of ways, for example, relative to a current location of the lead vehicle, relative to a path history of the lead vehicle, relative to the location of the lead vehicle and subject to a restriction of a current lane of travel. A number of methods to define follower positions within a platoon are envisioned, and the disclosure is not intended to be limited to the particular exemplary embodiments described herein.

Use of path history of the lead vehicle can be used to position and guide Follower Vehicles within the platoon. One exemplary embodiment includes when the Leader Vehicle is a manually operated vehicle and Follower Vehicles are autonomously driven. Such an embodiment can be described as leader dictated platooning. In such a method, none of the platoon members require onboard digital maps. The Leader Vehicle path history is calculated and distributed wirelessly to the Follower Vehicles and used as the reference maplet for that platoon. Also the destination of the platoon vehicles need not to be distributed in advance to the Follower Vehicles and the manually operated Leader Vehicle is in full controlled of the destination of the platoon.

As described above, a unitarily operating host vehicle can maneuver based upon information regarding an environment around the host vehicle, for example, based upon data regarding a tracked target vehicle or target object proximate to the vehicle or based upon data describing a lane geometry. In this way, a host vehicle receives data from outside the vehicle and operates based upon the data. Such data can be communicated to the host vehicle over wireless V2X communications, for example, including over V2I communications, including data from an infrastructure device, and over V2V communications, including data from nearby or target vehicles. The communicated data can include a number of embodiments, for example, including traffic signal commands, commands to transit an infrastructure device managed intersection, data regarding sensed obstructions upon a roadway, data regarding pedestrians near the roadway, a GPS localizing signal, and a remotely planned travel route. Similarly, a Follower Vehicle within a platoon can be operated according to methods described herein. A Follower Vehicle can act as a host vehicle described above, but instead of operating as a unitary vehicle, the Follower Vehicle receives data over V2V communications from a Leader Vehicle and operates based upon the data in the context of the platoon. Such data, utilized by the Follower Vehicle, can include a number of embodiments, including commands to join, leave, or maintain a position relative to the platoon, commands to assume a particular follower position within the platoon, or commands adjusting the current follower position relative to the Leader Vehicle. Such commands to a Follower Vehicle from the Leader Vehicle of a platoon can include commands based upon a GPS location that the Follower Vehicle is commanded to, for example, a follower position within the platoon. Such commands can be based upon a path history of the Leader Vehicle, describing a relative trajectory that the Follower Vehicle must follow based upon the travel of the Leader Vehicle. Such data includes either explicitly or inherently the distances necessary to maintain required distances or ranges within the platoon and additionally includes data required to operate the Follower Vehicle and the overall platoon in relation to an operating environment of the platoon, including, for example, lane geometry, traffic signals, presence of target vehicles or target objects outside of the platoon, and interactions with other platoons on the road. Data and commands described in any of the above embodiments can take the form of a GPS coordinate with which the respective unitary or Follower Vehicle may operate in traffic and/or within a platoon.

Selection of and changes to platoon formations can be determined according to a number of factors. For example, road geometry is a consideration to platoon formation. Upon a single lane road, only an in-line formation can be used, while on a four-lane highway, a side-by-side formation can be properly used. In a platoon utilizing side-by-side formation upon a four-lane highway, the formation can be properly changed to an in-line formation as road conditions change. For example, if road construction is abruptly encountered, and four lanes are reduced to two, changing the platoon to an in-line formation might be advantageous in order to facilitate traffic flow through the bottleneck. Upon passing the bottleneck and traffic resuming to four lanes of travel, the platoon can be shifted back to a side-by-side formation. Detection of an obstruction, an object, or an indication of an impassible lane, either as detected by one of the vehicles in the platoon or as communicated by some outside infrastructure device to the platoon, can be similarly utilized to change the formation of the platoon. In another example, platoon goals or priorities are considerations to platoon formation. For example, if fuel efficiency is a priority for the platoon, an in-line formation with tight ranges can be the most advantageous in order to gain efficiencies from drafting. In another example of a priority, if social interaction is a priority between the occupants of the different vehicles, then a block formation, with nearly equal vehicles in-line and side-by-side might be the most advantageous, in order to facilitate the perception of community of the occupants traveling together. In another example of a factor affecting selection of formation, the number of vehicles in the platoon might affect the selection of the formation. For example, if three vehicles are in the platoon, an in-line formation might be easily maintained throughout the transit route. If fifteen vehicles are in the platoon, an in-line formation of fifteen vehicles would be difficult to maintain through a series of traffic signals. Instead, a side-by-side formation of three columns of vehicles, each five vehicles long, would be more likely to be able to navigate the series of traffic lights without being unnecessarily split or temporarily disbanded by the changing traffic signals. The same formation, entering a long stretch of road without traffic signals, might change formation to a single column to take advantage of increased fuel efficiency made possible by drafting.

According to one embodiment of the disclosure, for a vehicle to participate in a platoon formation, it must be equipped with required vehicle-to-vehicle (V2V) communications capabilities and implement at least a core subset of the formation management protocol and associated processing and maneuvering functions. Some vehicles may be capable and configured to take any role in the formation. Others, based on vehicle equipment, or driver/occupant characteristics, may be constrained to a smaller range of roles within the formation. Participating members of the formation are called participants or more particularly Leader Vehicles and Follower Vehicles.

Each position within the formation has two main properties that define its overall state. The first is whether the position has a vehicle currently assigned to it or not. If a vehicle is assigned to a position, it is expected that the vehicle will maneuver into that position as it is appropriate to do so and maintain its relative placement there as long as it participates in the formation. The second property is the physical disposition of the area at and near the defined position. Together, these properties define a number of possible states. In an open state, no vehicle currently occupies the physical area of the position and nothing directly prevents a joined vehicle from maneuvering into this position. There are two significant sub-states for the open state: available, wherein no vehicle is assigned to this position in the formation; and reserved, wherein the assigned vehicle is not currently in position (but may take this position, given suitable conditions and enough time). In an unnavigable state, physical access to this position is prevented due to roadway geometry (the position would be off the drivable part of the roadway, over an embankment, et cetera). In an invaded state, a vehicle that has not joined the formation physically occupies that position (may be a non-equipped vehicle, or a vehicle in another formation). In a vacated state, a vehicle that was recently in the formation is leaving the formation, but may still be physically in or near the position. In an encroached state, a vehicle from the formation assigned to another position is instead occupying at least part of the position. In a blocked state, other vehicles in the formation are currently distributed in a manner that blocks direct maneuvering into the position; reassigning vehicles to the various positions may eliminate the blocked state. In an occupied state, the vehicle currently assigned to the position is physically occupying it. A number of other states are envisioned, for example, describing encouraged or prohibited conditions. For example, presence of a large truck in the platoon would limit placement of a vehicle just in front of the truck, and a state describing an undesirable arrangement could be defined. A dependent state could be defined, wherein family members might want to stay in proximate positions within the formation, and one family member position could be made dependent upon another family member position. Non-urgent preferences could be handled by convenience, for example, including a bubble-sort logic whenever a formation changes. For example, a person in the rear of a formation could request to move toward the front of the formation. Such a non-urgent request could be delayed until the next time the formation changes from a side-by-side formation to an in-line formation, at which time the requesting vehicle can move some or all of the way toward the front of the formation, past vehicles without similar requests. The states described herein are exemplary states that can be utilized in a platoon, and the disclosure is not intended to be limited to the particular examples described herein.

Figure 19:
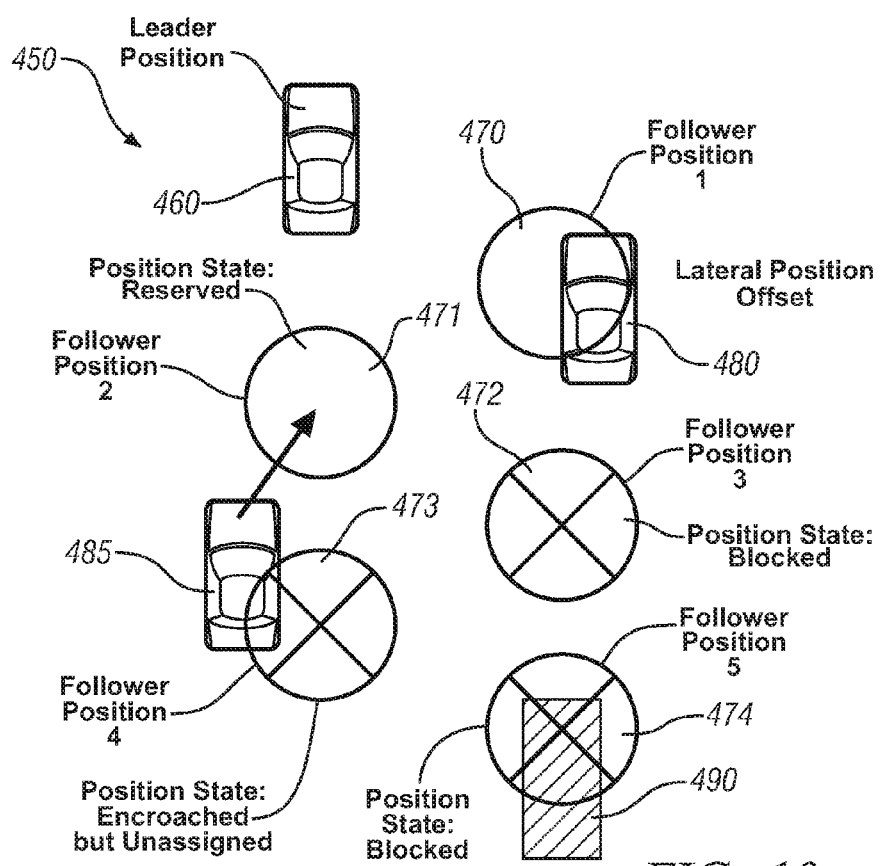
FIG. 19 depicts an exemplary platoon, a number of defined positions within the platoon, and a number of illustrative states for the depicted positions, in accordance with the present disclosure.

FIG. 19 depicts an exemplary platoon, a number of defined positions within the platoon, and a number of illustrative states for the depicted positions, in accordance with the present disclosure. Platoon 450 includes Leader Vehicle 460, a number of defined follower positions 470, 471, 472, 473, and 474, Follower Vehicles 480 and 485, and an unequipped vehicle 490. According to methods described herein, follower positions 470 through 474 are defined according to the position of the Leader Vehicle and factors affecting definition of formation and resulting positions within the platoon. In the exemplary condition, the Leader Vehicle 460 occupies a lead position. Position states describe a status of the position within the platoon. Exemplary position states include open, open and available, open and reserved, unnavigable, invaded, vacated, encroached, blocked, and occupied. An open position state describes a condition wherein no vehicle currently occupies the physical area of the position and nothing directly prevents a joined vehicle from maneuvering into this position. An available sub-state to the open position state describes a condition wherein no vehicle is assigned to this position in the formation. A reserved sub-state to the open position state describes a condition wherein an assigned vehicle is not currently in position but may take this position, given suitable conditions and enough time. An unnavigable position state describes a condition wherein physical access to this position is prevented due to roadway geometry. Examples of conditions which would render a position unnavigable could include a position that would be off the drivable part of the roadway or over an embankment. An invaded position state describes a condition wherein a vehicle that has not joined the formation physically occupies that position. Such an invading vehicle may be a non-equipped vehicle, an equipped vehicle not joined in a formation, or a vehicle in another formation. A vacated position state describes a condition wherein a vehicle that was recently in the formation is leaving the formation, but may still be physically in or near the position. An encroached position state describes a condition wherein a vehicle from the formation assigned to another position is instead occupying at least part of the position. A blocked position state describes a condition wherein other vehicles in the formation are currently distributed in a manner that blocks direct maneuvering into the position. Such a blocked position state can be cleared by reassigning vehicles to the various positions of the formation. An occupied position state describes a condition wherein the vehicle currently assigned to the position is physically occupying it.

Referring to FIG. 19, follower position 1 has a position state: occupied, based upon Follower Vehicle 480 being in the follower position 1, position 470. Follower position 2, position 471 has a position state: reserved, based upon Follower Vehicle 485 being controlled to enter follower position 2, position 471. Follower position 3, position 472 has a position state blocked. Such a blocked state can be a result of a number of obstacles, identified road hazards, lane markers, or any other condition that prevents a Follower Vehicle from being assigned to that position. Follower position 4, position 473 has an encroached state due to a current position of vehicle 485. The position also includes an unassigned state, allowing a subsequent vehicle to be assigned to the position, however, movement into the position is prohibited so long as the state remains encroached. Follower position 5, position 474 has a blocked state due to the presence of vehicle 490. The follower positions described and the states defined for the various positions are exemplary conditions that may exist, and the disclosure is not intended to be limited to the particular embodiments described. It is noted that the positions described in FIG. 19 are considered nominal positions, describing generally a formation of the platoon and vehicles arranging into that formation. These nominal positions differ from the actual spacings or distances between vehicle positions, as will be described in greater detail herein, for example, in relation to FIG. 17.

The positions may be ranked in prominence, starting with the Leader position (position #0, highest prominence), then position #1 (highest follower prominence), position #2, and so on for all defined positions. Generally, the higher prominence positions will be nearer to the Leader Vehicle, although special formations may use different approaches. Higher prominence positions will tend to be assigned to participants before lower prominence ones to keep the formation as compact as possible or to achieve other objectives.

The leadership role can be either or a combination of autonomous vehicle systems and a human operator that is qualified, capable, and willing to lead potentially many Follower Vehicles along a path. At any point in time, there may be a defined navigation destination, or the human driver may be manually controlling the Leader Vehicle path with no particular destination defined. The Leader Vehicle systems must be capable of translating the human driving inputs or the planned navigation route into detailed path and motion instructions that is used to coordinate the overall motion of the Follower Vehicles. The Leader Vehicle must be capable of broadcasting the driving formation definition and position assignments to the Follower Vehicles, and must implement formation management protocols with other vehicles to coordinate changes to the formation participation (membership).

Potential Leader Vehicles have a defined level of ambition that controls how quickly the potential Leader Vehicle will attempt to claim leadership in situations that call for a new Leader Vehicle. If a vehicle is not properly equipped for the leadership role, the ambition level will be set to zero. If the vehicle is being used by a less-qualified human driver/occupant or by a person who prefers not to serve as a Leader Vehicle, the ambition level may be configured low. If two or more potential Leader Vehicles have equal ambition levels, leadership will be granted on a "first requested" basis, although the use of small random additional wait times (similar to the random back-off periods in network media access control protocols) may be implemented to further reduce the leadership conflicts.

An exemplary method of autonomous or semi-autonomous platoon formation is described in detail. Vehicles begin in unitary driving mode, although unitary driving includes both manual navigation (human-driven) and autonomous navigation (e.g. autonomous "valet" mode). The vehicle may be configured to advertise its willingness to create a formation as a Leader Vehicle and/or join a formation as Follower Vehicle. This willingness may be specified in terms of specific other vehicles; a defined grouping of vehicles, such as a group for a specific human family; or classes of formations. Classes of formations can include virtual school bus formations, with children within autonomously operated vehicles linking up at designated times and places to travel in a formation to school, and common commute formations, wherein groups of vehicles could develop calendars and meeting times for vehicles to form a formation for a common commute. Each vehicle in unitary driving mode will listen for formation advertisement message from other vehicles and respond as appropriate. A vehicle operating in a unitary, autonomous, valet mode, can utilize the autonomous methods described herein to operate without an operator within the vehicle. Such a vehicle, after dropping off a passenger at a destination, could be instructed to find a local parking lot and given instructions on when to return to the drop-off point. In the alternative, wireless communications over a network could be utilized to call the vehicle when it is needed at the pre-assigned or otherwise designated location.

If a potential Leader Vehicle receives an advertisement from a potential Follower Vehicle, and that potential Follower Vehicle does not indicate a higher level of leadership ambition, and other conditions do not inhibit it, the Leader Vehicle will transmit a "Create Formation" message. All potential Follower Vehicles may then respond with an "Accept Formation" message. If at least one potential Follower Vehicle responds with the "Accept Formation" message, the potential Leader Vehicle takes the leadership role and begins serving as the Leader Vehicle for the new formation. The potential Follower Vehicles may begin requesting to join the formation as defined below.

Control of a platoon can be a static control scheme, with the formation including fixed positions and the platoon reacting to the environment around the platoon with the platoon acting as a fixed entity. Such a static platoon can be formed at the beginning of a planned travel route and dissolved as required, for example, at the end of the planned travel route. In the alternative, platoon control can include dynamic platoon formations, with the platoon reacting to changing conditions around the platoon. Similarly, platoon formations, shapes, positions within the formation, and roles within the formation can all be dynamic. For example, members of the platoon can be added or removed from the platoon in the middle of a planned travel route, either as part of a predetermined plan or as a reaction to changing instructions of the vehicle occupant. A vehicle can request to change position within the formation, example, based upon a planned maneuver to exit the formation, based upon a desired view outside of the vehicle, or based upon preferences such as claustrophobia. In another example, one vehicle can be a Leader Vehicle through a first portion a planned travel route, and at some point, another member can communicate a desire to take the leadership role in order to relieve the current Leader Vehicle (from a long manual driving stretch), or to utilize the knowledge of the vehicle occupant regarding the locale being traveled through. A number of changes to a platoon shape, vehicle positions, and vehicle roles are envisioned, and the disclosure is not intended to be limited to the particular exemplary embodiments described herein.

Figure 20:
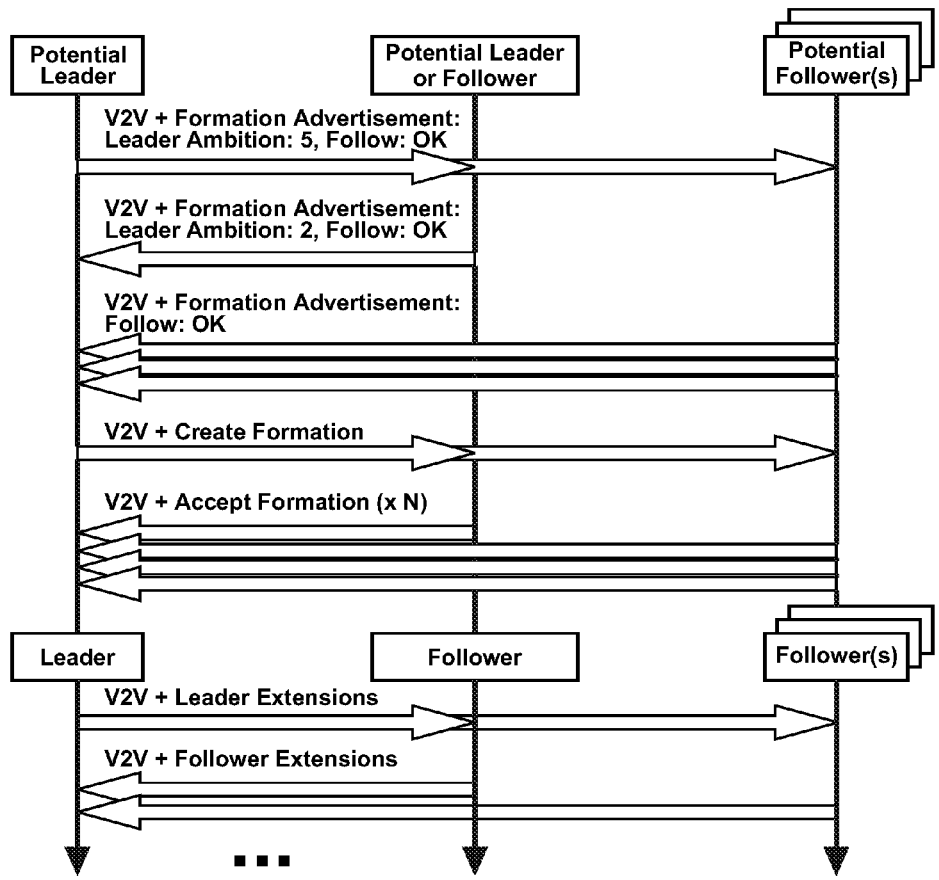
FIG. 20 depicts exemplary decisions that are made in creating a platoon, in accordance with the present disclosure.

FIG. 20 depicts exemplary decisions that are made in creating a platoon, in accordance with the present disclosure. According to the exemplary process, a potential Leader Vehicle advertises to other vehicles a desire to form a platoon. Such an advertisement is depicted from the potential Leader Vehicle to another potential Leader Vehicle or Follower Vehicle and at least one potential Follower Vehicle. The advertisement is accompanied by a leadership ambition value. The other potential Leader Vehicle and potential Follower Vehicles can respond, accepting or rejecting the advertisement. Additionally, the responding vehicles can respond with a leadership ambition value or their own. Based upon acceptances and comparisons of leadership ambition, a formation is formed around a Leader Vehicle and communication between the Leader Vehicle and the various Follower Vehicles is managed. Such a formation is depicted, including creation of a formation by the Leader Vehicle, acceptance of the formation by the Follower Vehicles, designation of the Leader Vehicle, and subsequent exchanges of leader and follower extensions or communications.

Figure 28:
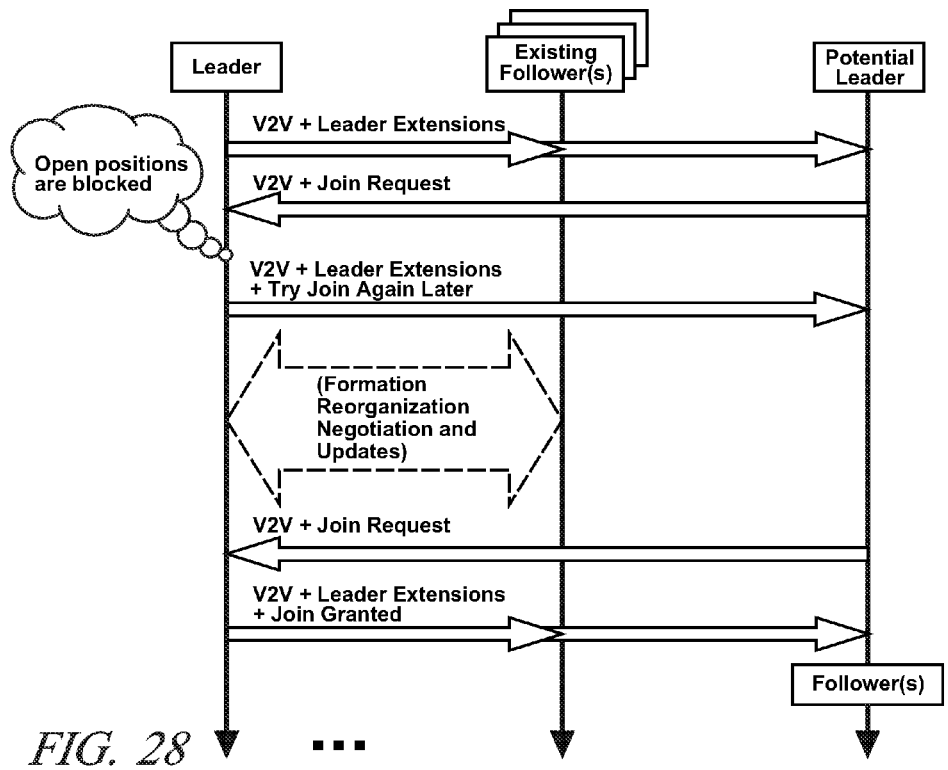
FIG. 28 depicts and exemplary process for a vehicle to join a platoon, in accordance with the present disclosure.

A vehicle who is not currently a member of a formation can send a "Join Request" message to indicate that it wants to join. FIG. 28 depicts and exemplary process for a vehicle to join a platoon, in accordance with the present disclosure. If there is at least one available open position, the Leader Vehicle can acknowledge the join request with a "Join Granted" message and the new vehicle's assigned position. The Leader Vehicle will generally assign the new vehicle to the highest-prominence open position whose requirements the new vehicle will meet. The Leader Vehicle can initiate entry of the requesting vehicle, for example, commanding the vehicle to a position wherein entry can be made in an orderly manner. In one exemplary method, a new position can be added to a formation to make room for the joining vehicle. In another exemplary method, a plurality of unused positions can be maintained by the Leader Vehicle at any given time, allowing for flexibility in vehicles changing positions or new members being added. If there is an unassigned position that is encroached or blocked, the Leader Vehicle may ask the new vehicle to "Try Join Again Later." In the meantime, the Leader Vehicle may reorganize the formation to improve accessibility by the new vehicle by negotiating with the current formation participants to take new positions. If the Leader Vehicle is capable and willing to grow the formation, a new formation description will be broadcast before the join request acceptance message is sent to the new vehicle. Note that each position may have minimal obligation requirements (e.g. Position 1 requires that the occupants be fully licensed, while position 2 does not).

Figure 29:
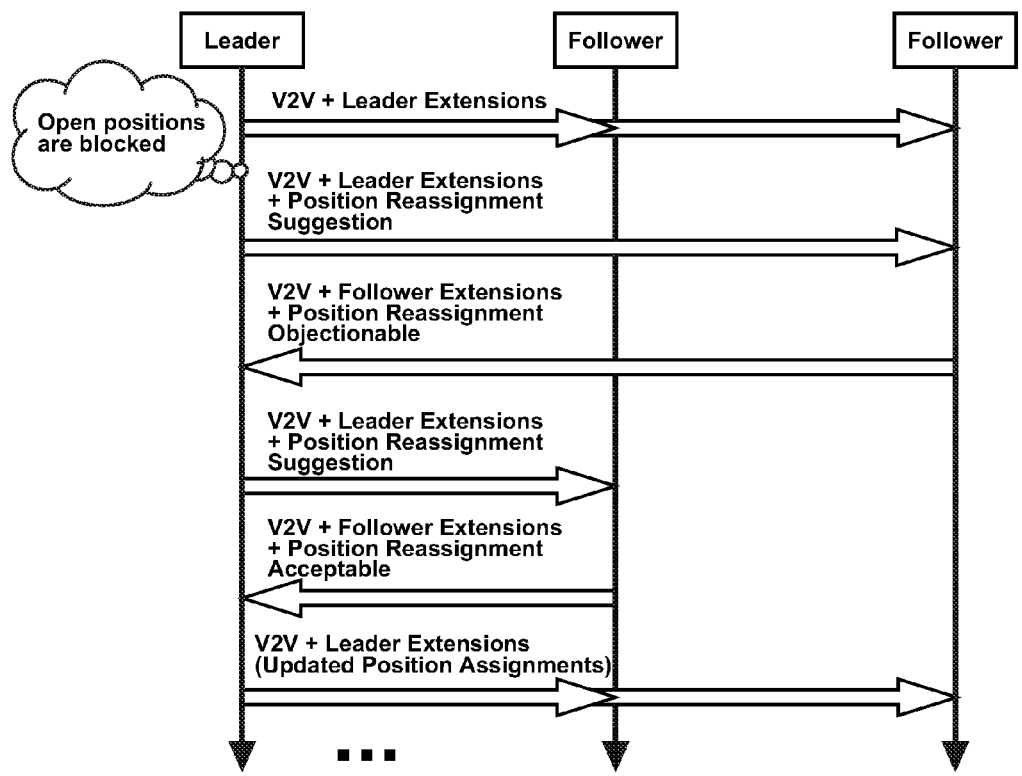
FIG. 29 depicts an exemplary process whereby positions within a formation can be reassigned, in accordance with the present disclosure.

FIG. 29 depicts an exemplary process whereby positions within a formation can be reassigned, in accordance with the present disclosure. If the Leader Vehicle detects a situation where a new vehicle cannot join the formation, or other conditions justify reassigning vehicles to the formation positions, the Leader Vehicle may simply update the formation position assignment list and each Follower Vehicle would be responsible to maneuver into the newly assigned position. However, the Leader Vehicle may optionally consult with the Follower Vehicle by first sending a "Position Reassignment Suggestion" message. The Follower Vehicle may respond with a "Reassigned Position Reassignment Acceptable" or "Position Reassignment Objectionable" (perhaps the Follower Vehicle intends to leave the convoy in a particular direction and the new position would interfere). If one Follower Vehicle objects to the reassignment of positions, the Leader Vehicle may try another.

Figure 30:
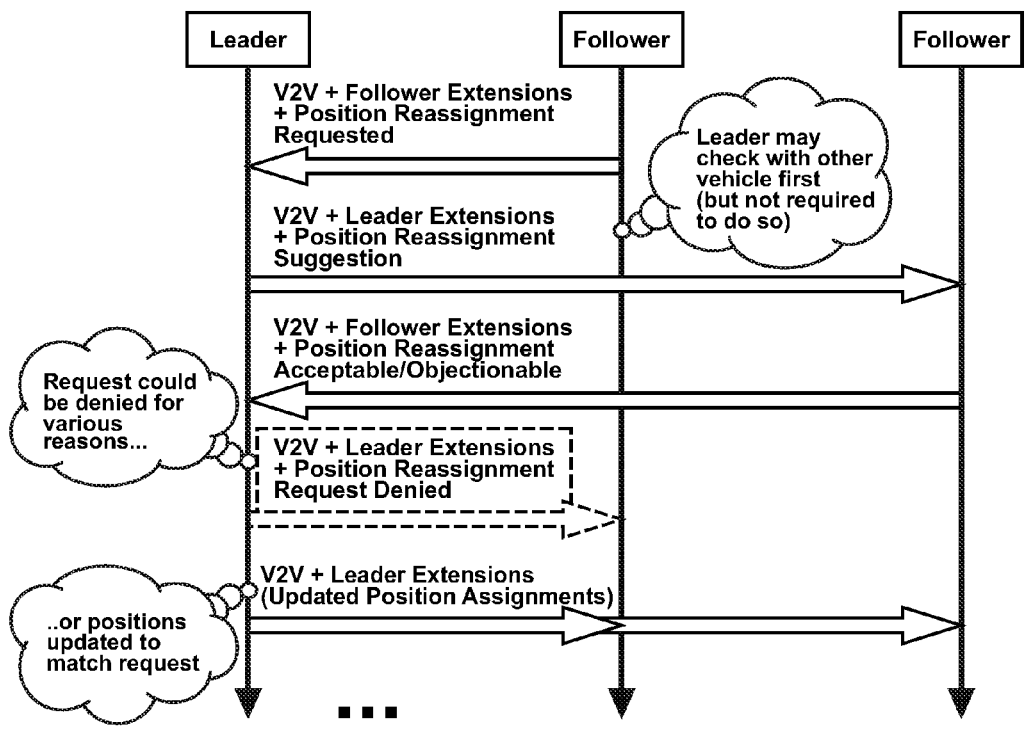
FIG. 30 depicts an exemplary process whereby a Follower Vehicle can request a position change, in accordance with the present disclosure.

FIG. 30 depicts an exemplary process whereby a Follower Vehicle can request a position change, in accordance with the present disclosure. If one Follower Vehicle wishes to swap places with another Follower Vehicle, or simply move into a different open position in the formation, it makes a "Position Reassignment Request" to the Leader Vehicle. The Leader Vehicle may issue "Position Reassignment Suggestion" to any Follower Vehicle who might be displaced by the proposed reassignment and wait for the reply, as described above. If the Leader Vehicle has some reason to refuse the request, it will issue a "Position Reassignment Request Denied" message to the requestor. Otherwise, the Leader Vehicle may simply update the assignments in the Position Assignments and Roles segment of the V2V broadcasts.

Figure 31:
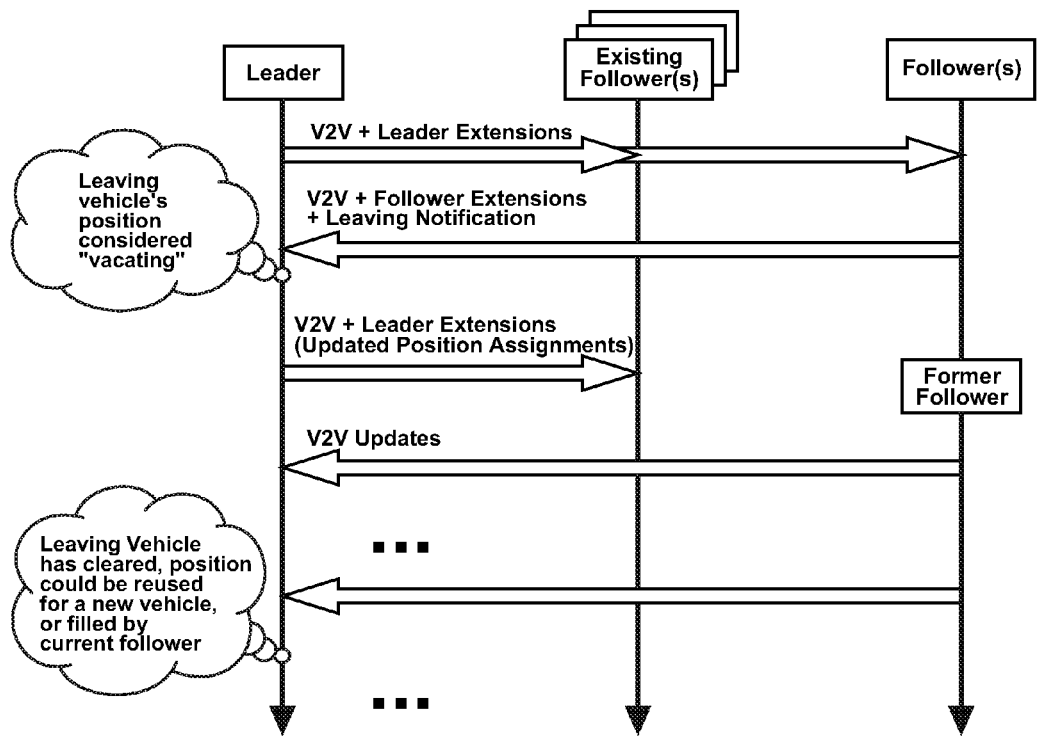
FIG. 31 depicts an exemplary process whereby a Follower Vehicle can request to leave a platoon, in accordance with the present disclosure.

FIG. 31 depicts an exemplary process whereby a Follower Vehicle can request to leave a platoon, in accordance with the present disclosure. If a Follower Vehicle wishes to leave the formation, it notifies the Leader Vehicle by sending a "Leaving Notification" message. The Leader Vehicle will send an acknowledgement message. The position is then considered "Vacating" until the leaving vehicle has physically moved away from the defined position, at which time it may be considered open, blocked, or encroached, as appropriate to the existing conditions. The Leader Vehicle may then reposition other vehicles to fill the vacated position. The Leader Vehicle may also reposition the requesting vehicle to facilitate or initiate the leaving of the vehicle. Later, the former formation participant could be considered an "invader" if it attempts to move into formation again without requesting and getting approval to join the formation.

Figure 32:
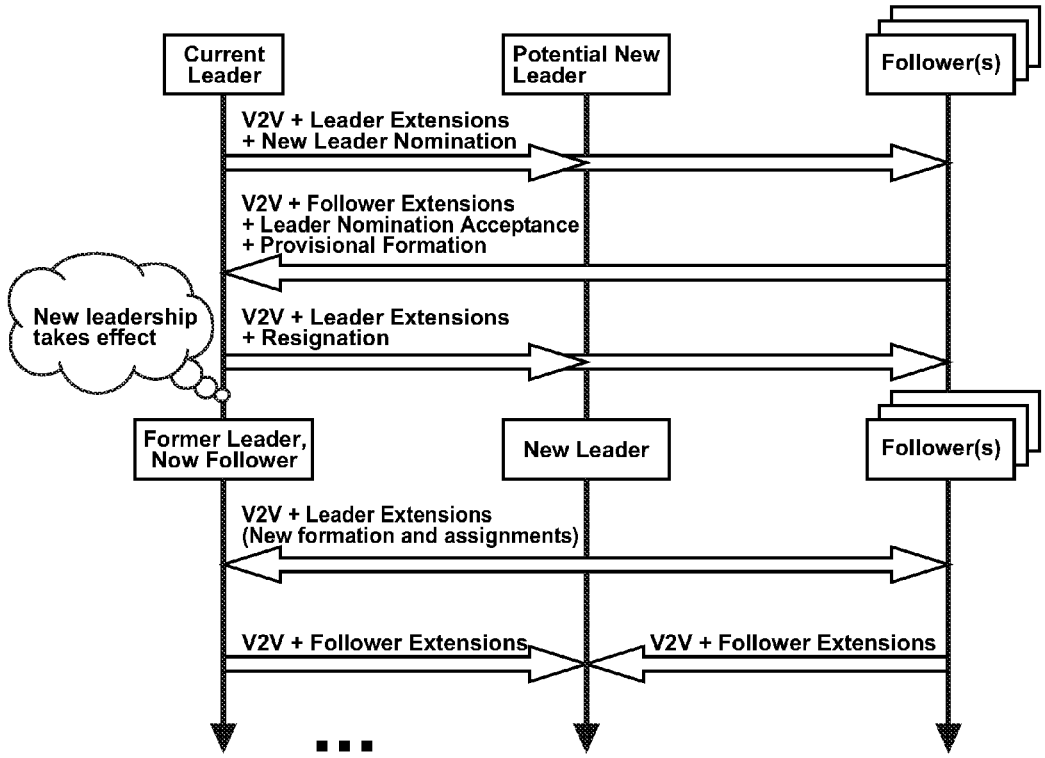
FIG. 32 depicts an exemplary process whereby a Leader Vehicle can relinquish leadership of a platoon and assume a flowing vehicle status, in accordance with the present disclosure.

FIG. 32 depicts an exemplary process whereby a Leader Vehicle can relinquish leadership of a platoon and assume a flowing vehicle status, in accordance with the present disclosure. If the Leader Vehicle intends to leave the formation, or simply wishes another vehicle to take the lead, the Leader Vehicle will check for any specific new Leader Vehicle selection from the human driver, and if there is none, the Leader Vehicle systems will search the current formation participants for another vehicle capable of assuming the leadership role, considering current position prominence, but also human occupant characteristics and configured vehicle settings. If a new Leader Vehicle is identified either way, the Leader Vehicle will send a "new leader nomination" message to the formation. The nominated Leader Vehicle will reply with a "Leadership Nomination Acceptance" message that indicates whether it accepts or rejects the nomination, and, if it is willing to accept, also defines the provisional formation it will utilize when it becomes the Leader Vehicle (it may be the same, or it may define new relative positions such that no physical maneuvering of the current and new Leader Vehicles will be needed, at least at first). If the current Leader Vehicle receives nomination, it broadcasts a "Resignation" message and swaps position assignments with the new Leader Vehicle. Then the new Leader Vehicle begins performing the movement coordination and formation management roles expected of the Leader Vehicle.

Figure 33:
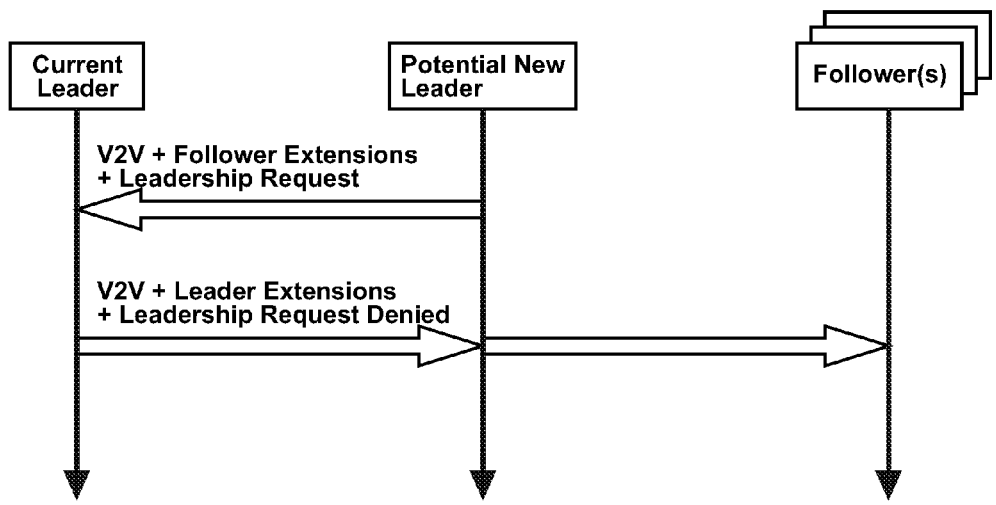
FIGS. 33 and 34 depict an exemplary process whereby a Follower Vehicle can request a change in formation leadership and reactions that can occur based upon the response of the Leader Vehicle, in accordance with the present disclosure.
Figure 34:
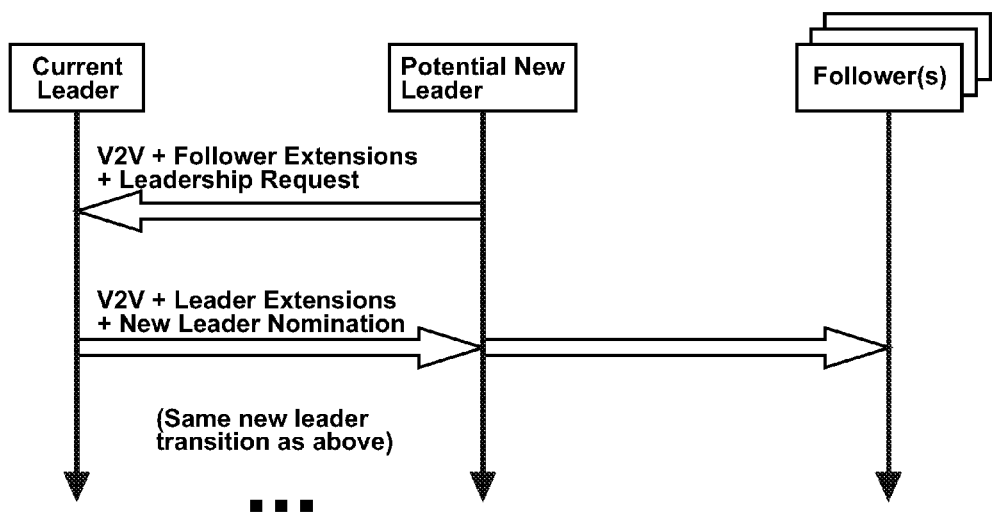

FIGS. 33 and 34 depict an exemplary process whereby a Follower Vehicle can request a change in formation leadership and reactions that can occur based upon the response of the Leader Vehicle, in accordance with the present disclosure. FIG. 33 describes an exemplary reaction if the request is denied. FIG. 34 describes an exemplary reaction if the request is granted. If directed by the human driver, a Follower Vehicle in the formation may send a "leadership request" message to the current Leader Vehicle and all other formation participants. If the current Leader Vehicle receives it, it may send a "leadership request denied" and continue operating as the Leader Vehicle. The current Leader Vehicle may also respond with the Leader Resigning protocol as described above to implement a smooth transition of leadership.

Figure 35:
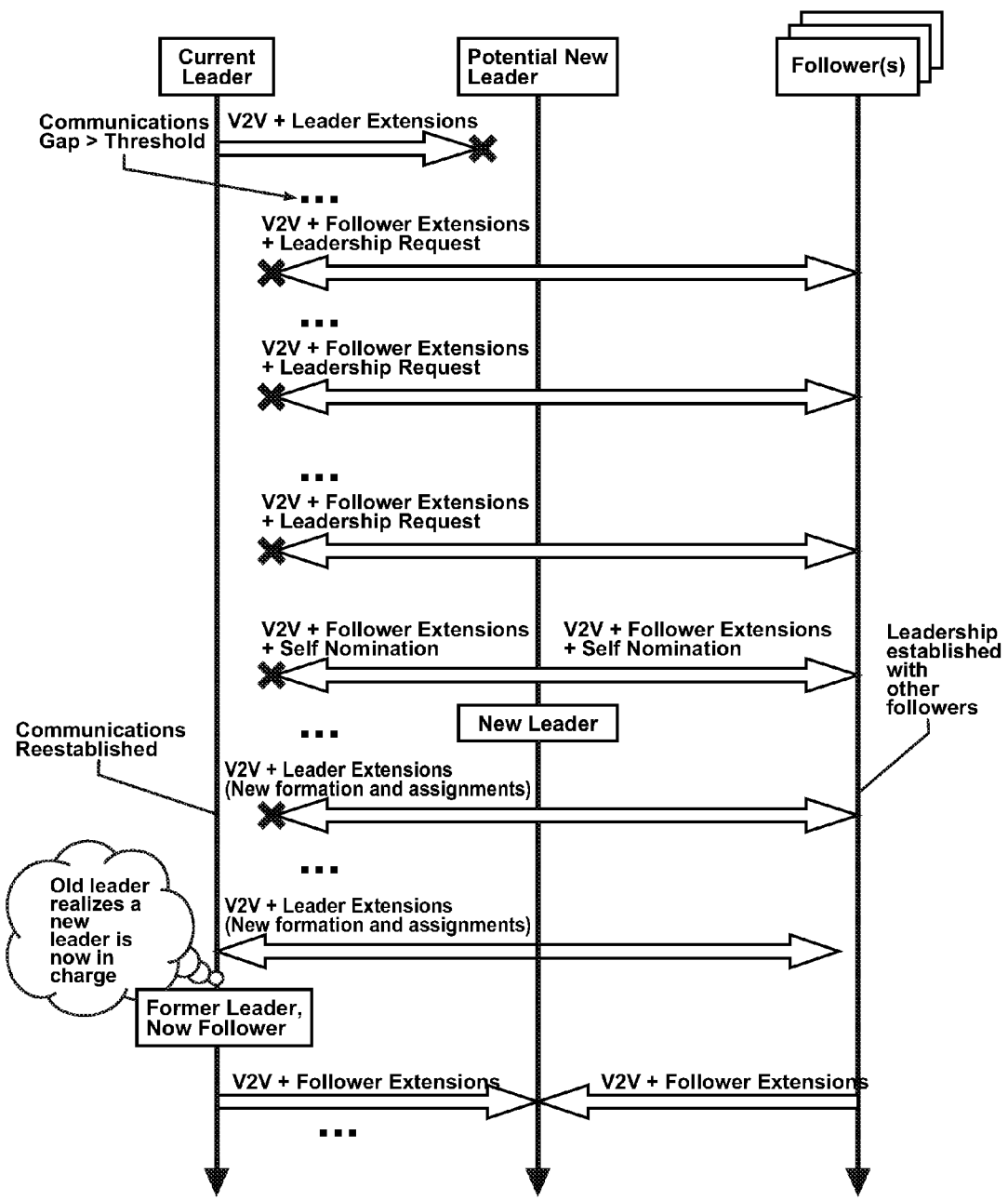
FIG. 35 depicts an exemplary reaction if communication between a Leader Vehicle and Follower Vehicles in a formation are lost, in accordance with the present disclosure.

FIG. 35 depicts an exemplary reaction if communications between a Leader Vehicle and Follower Vehicles in a formation are lost, in accordance with the present disclosure. In the case of a communications anomaly between the current Leader Vehicle and the remainder of the formation (as described below), one of the other vehicles may attempt to take the leadership position, after a wait period that is a function of that vehicle's current ambition level. To do so, it sends a "leadership request" message. If the requesting vehicle does not receive any response from the Leader Vehicle within a timeout period (e.g., 100 ms), an exemplary requirement can require the requestor to repeat the request message and wait for response two more times. If at this point there is still no response, the vehicle requesting leadership must send a "self-nomination" message to the formation. If a participant vehicle receives at least two "leadership request messages" followed by a "self-nomination" message, it should send an "endorsement" message. If all other vehicles besides the current Leader Vehicle and the vehicle requesting leadership respond with an endorsement message, the requesting vehicle takes the leadership role and begins serving as Leader Vehicle for the rest of the formation. The new Leader Vehicle will note its new leadership start time.

If any vehicle in the current formation hears a "leadership request" from another participant, it will not itself attempt to request the leadership role for a small fixed time period, plus a wait time that is a function of its ambition level. If the former Leader Vehicle suddenly regains communications capability and receives a message from the new Leader Vehicle, it will compare the other's leadership start time with its own. If the other's start time is more recent, the former Leader Vehicle will immediately switch to the follower role and assume the position assigned to it by the new Leader Vehicle. If the start time is not more recent, there must be a serious time synchronization problem, so fail-safe procedures would be initiated.

Figure 36:
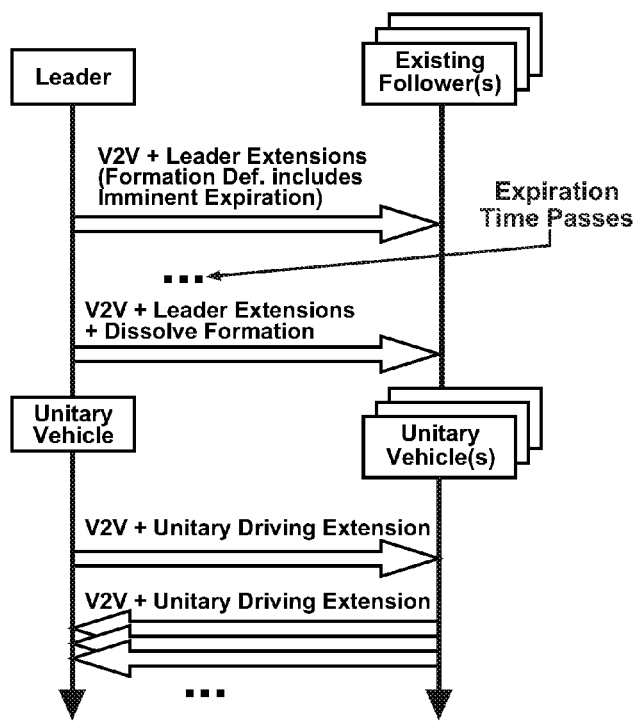
FIG. 36 depicts an exemplary reaction if a Leader Vehicle decides to dissolve a platoon, in accordance with the present disclosure.

FIG. 36 depicts an exemplary reaction if a Leader Vehicle decides to dissolve a platoon, in accordance with the present disclosure. The Leader Vehicle may dissolve the formation at any time, although it is expected to "warn" the formation participants that the formation will end soon through one of the properties of the transmitted formation definition (one element of the formation data should be a "formation expiration time" time). The typical reason a Leader Vehicle would dissolve the formation is that the formation has reached a destination and the individual vehicles need to find a suitable parking location. If the formation is dissolved during normal navigation, another vehicle could attempt to create a new formation from the participants of the old formation and carry on to the destination. Preferable to this scenario, however, would be for the previous Leader Vehicle to resign leadership as described above so a smooth transition is possible.

If the Leader Vehicle detects long-lasting situations of unnavigable and/or invaded positions, or the Leader Vehicle driver requests it, the Leader Vehicle may command a new formation and assign each participating vehicle to a position within it, and broadcast the new position assignments. For example, if the current formation is a "block" pattern but the navigable roadway narrows considerably, the Leader Vehicle may command a "single-file" formation.

For less-dramatic changes of conditions, the Leader Vehicle will adjust the existing formation pattern instead of switching to a new pattern. For example, the Leader Vehicle may increase the following distances within the formation as the group's speed increases to allow for adequate braking distances. Also, through turns, the formation spacing will be reduced for the portion toward the center of curvature, while it will be expanded on the opposite side. If two vehicles are swapping positions, additional space around them could be opened by adjusting the other vehicle positions within the formation, then the two vehicles could slowly guided through intermediate positions before they are given the new position assignment IDs.

A Leader Vehicle of a formation must set a speed acceptable to all members of the formation. The Leader Vehicle checks the speed capabilities of a new vehicle joining the formation and periodically checks the speed capability of each participating vehicle and determines the fastest speed all the vehicles are capable of achieving. The Leader Vehicle may also check the joining vehicle braking capabilities and reviews performance critical vehicle diagnostics before granting the new member to join the platoon. This determination will also include analysis of the motion feedback data, including the speed error terms, so that a participant that is falling further and further behind, despite its reports that it is capable of additional velocity, is not stranded by the rest of the formation. This formation speed constraint is used as an upper limit for all navigation planning.

Exemplary vehicle-to-vehicle communication can be based on periodically-broadcast "V2V Over-the-Air (OTA) Transportation Safety Message" packets. To this basic information, the formation's Leader Vehicle can append information, including the following: path history (in standard V2V OTA form), formation definition (FD), position assignments and additional role assignments (PA), navigation goals (NG), detailed motion coordination guidance (MC), "heard from" list, and any as-needed formation management protocol messages. Formation participants can respond by appending information, including the following: motion coordination feedback information, "heard from" list, and any as-needed formation management protocol messages.

Figure 37:
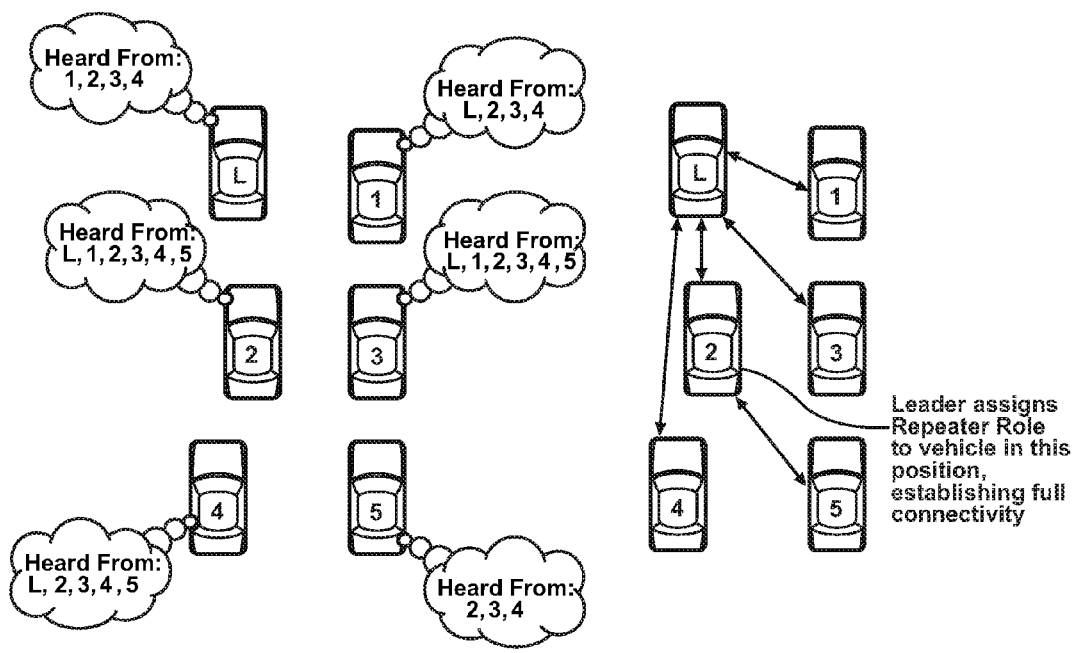
FIG. 37 depicts an exemplary connectivity map describing methods to accomplish extended connectivity between members of a platoon, in accordance with the present disclosure.

FIG. 37 depicts an exemplary connectivity map describing methods to accomplish extended connectivity between members of a platoon, in accordance with the present disclosure. The formation participants report a list of the other participants that they have "heard from" in the wireless communications channel within a recent time window. If the Leader Vehicle is not receiving reliable communications from one or more of the formation participants, the Leader Vehicle will scan the "heard from" lists to try to identify one or more participants who can hear them. The Leader Vehicle will then assign "repeater" roles to as many formation participants as needed to establish connectivity.

Figure 38:
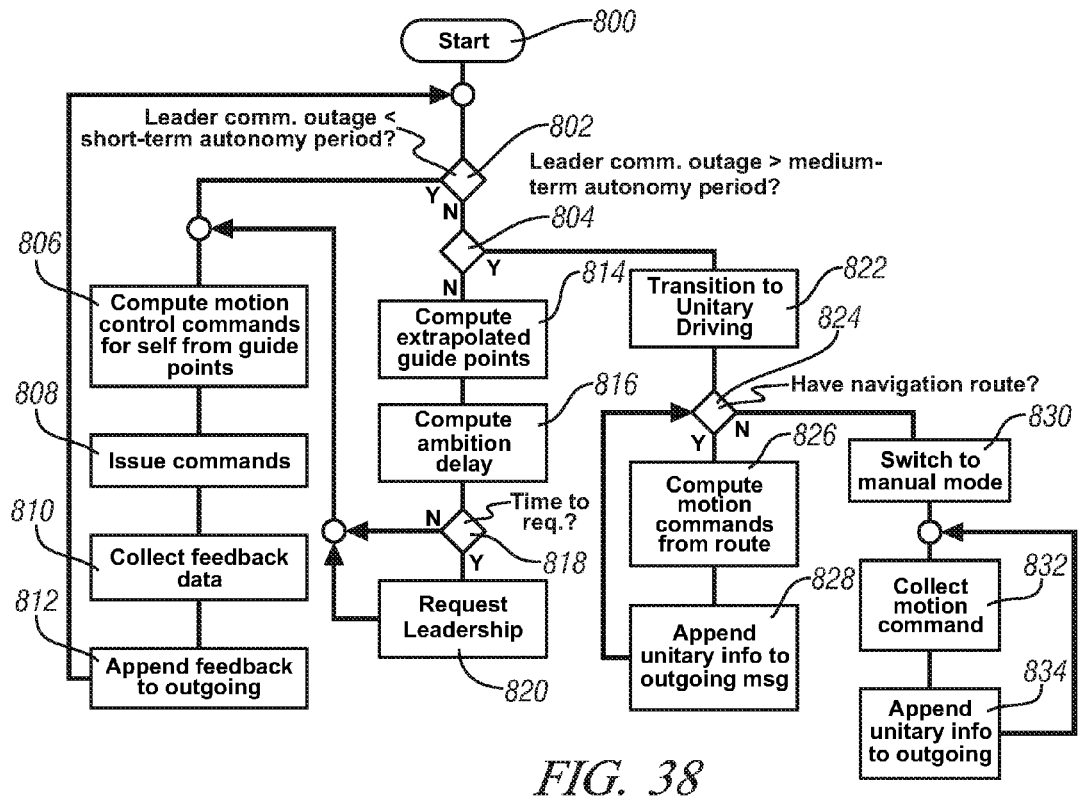
FIG. 38 depicts an exemplary process for managing communication issues within a platoon, in accordance with the present disclosure.

As described above, methods can be described for managing communication issues between members of a formation. FIG. 38 depicts an exemplary process for managing communication issues within a platoon, in accordance with the present disclosure. If the Leader Vehicle does not hear from a formation participant for a threshold time, and the above "repeater" approach does not work, the participant is considered "lost." While the participant is lost, the Leader Vehicle will not reassign the lost vehicle's formation position to another vehicle. Since the communication loss may be affecting the follower-to-leader transmissions, the Leader Vehicle may attempt to alter the formation geometry to bring the lost vehicle's formation position closer to the Leader Vehicle in order to clear up communications (assuming the Follower Vehicle can still receive at least some of the leader-to-follower broadcasts).

If the Leader Vehicle loses communication with all Follower Vehicles for a threshold time, it will assume that the formation has been dissolved or that another vehicle has taken the leadership. It will therefore switch to "unitary driving" mode, but will monitor the communications link for messages from its former Follower Vehicles. Follower Vehicles must be prepared to change roles if the Leader Vehicle becomes unavailable for any reason.

In the short term, even if a Follower Vehicle does not hear from the Leader Vehicle (either directly or through a "repeater" vehicle) during a short-term autonomy period (for example, 0.8 seconds or some defined "look ahead" period), the Follower Vehicle will continue to drive along the last-received motion coordination guidance path, and attempt to meet the specified position, velocity, and heading objectives at the appropriate times.

In the medium term, each vehicle will extrapolate the latest motion control guidance for an additional medium-term autonomy period, perhaps constrained by the defined navigation route (if it exists) and the need to avoid collisions with other formation participants. During this period, a vehicle in the formation that is qualified to serve in the leadership role will initiate the "leader request" process as described above. To avoid a power struggle, potential Leader Vehicles will wait a variable amount of time to initiate the leadership request depending on their configured "ambition" level. When the self-nominated Leader Vehicle assumes the leadership role, the formation may continue as before, although the previous Leader Vehicle will be considered lost.

In the event of a long term issue in communication between formation vehicles or, similarly, in the event of a disruption in on-board communication systems such as an overloaded controller area network (CAN), a speed profile definition in can be utilized in a control module to utilize a desirable stopping maneuver profile. In the alternative, if the medium-term autonomy period has passed and the Follower Vehicle has still not heard from the Leader Vehicle, the Follower Vehicle will attempt the following fail-safe procedures, for example, including the following: align the vehicle's heading with the current roadway's direction of travel using a moderate turning rate (if needed), switch to "unitary driving" mode and autonomous navigation, if possible, or if autonomous navigation is not possible (e.g. no route is defined), then begin a 0.05 g deceleration and signal driver to take over manual driving mode.

Returning to FIG. 30, an exemplary process is depicted starting at 800, whereupon a communication outage is monitored. At step 802, a Leader Vehicle communication outage is compared to a short-term autonomy period. Such a short-term autonomy period can be described as a selected time span wherein a vehicle can operate within a platoon formation without communicated instructions from the Leader Vehicle. Such a time span can be calibrated or can be a functional relationship, for example, determinable by the speed of the vehicle. If the outage is less than the short-term autonomy period, the process advances to step 806. If the outage is not less than the short-term autonomy period, then the process advances to step 804. At step 806, guide points utilized to move the vehicle through a controlled path and previously communicated to the vehicle by the Leader Vehicle are used to compute motion control commands. At step 808, these commands are issued to control the vehicle. At step 810, feedback data describing operation and travel of the vehicle are collected, and at step 812, this feedback data is appended to outgoing communications for reception by the rest of the platoon or other nearby vehicles and the process returns to step 802 wherein the communication outage is continued to be monitored. At step 804, the communication outage is compared to a medium-term autonomy period. Such a medium-term autonomy period can be calibrated or can be a functional relationship. If the outage is greater than the medium-term autonomy period, the process advances to step 822. If the outage is not greater than the medium-term autonomy period, then the process advances to step 814. At step 814, extrapolated guide points are computed based upon available information, for example, including the guide points that were pre-existing and any information available regarding the current lane geometry and other vehicles surrounding the vehicle. At step 816, leadership ambition of the present vehicle is computed. If the leadership ambition is high, the vehicle can be quick to request leadership to the remainder of the platoon still in communication with the vehicle. It the leadership ambition is low, the vehicle can wait for more time to see if the Leader Vehicle reestablishes communication or some other vehicle in the platoon requests leadership. At step 818, if the leadership ambition is such that it is time for the vehicle to request leadership, then the process advances to step 820 wherein the vehicle communicates a leadership request, according to methods described herein, and the leadership request may or may not result in the vehicle being designated the new Leader Vehicle. If step 818 determines it is not time to issue a leadership request or an issued leadership request is not accepted by the rest of the platoon, then the process advances to step 806, wherein short-term measures are taken to control the vehicle, as described above. If the process advances to step 822, a transition to unitary driving outside of the platoon is initiated. At step 824, it is determined whether a navigation route has been entered, instructing the vehicle regarding motion commands to be generated. If such a navigation route is present, the process advances to step 826 wherein the motion commands are generated and to step 828 wherein information describing a unitary driving status is appended to outgoing communications. If such a navigation route is not present, then the process advances to step 830, wherein a switch to manual mode is initiated. At step 832, instructions, for example, from an HID device or control, are collected describing motion commands to be generated. At step 834, information describing a unitary driving status is appended to outgoing communications. In this way, a vehicle within a platoon as described herein can be controlled through a loss in communication with a Leader Vehicle.

Figure 39:
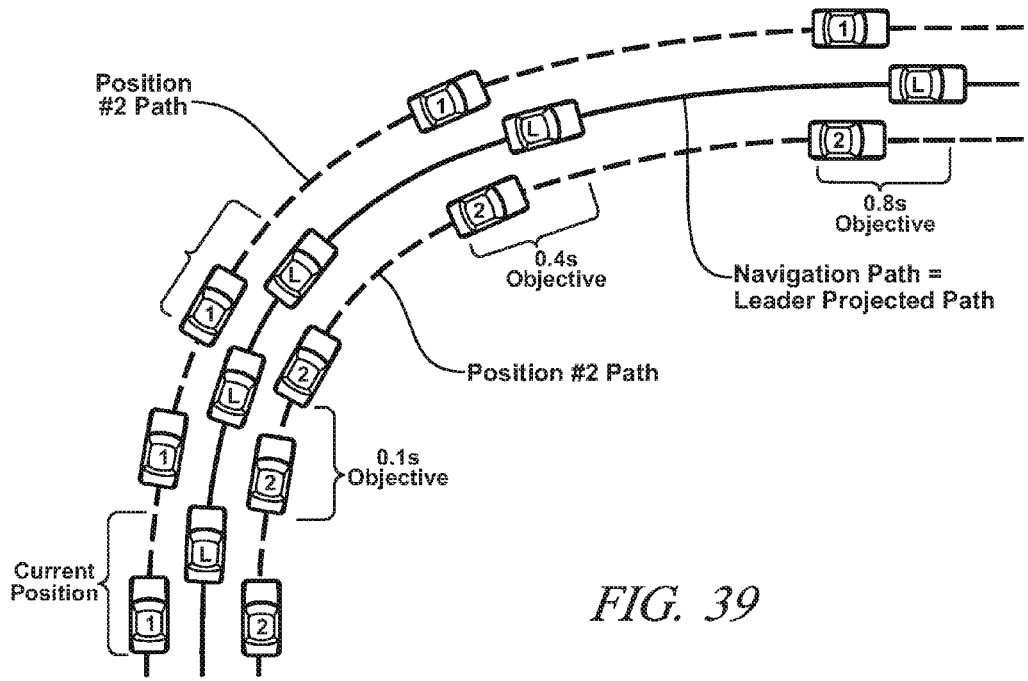
FIG. 39 depicts an exemplary projection of a path for a platoon to follow, in accordance with the present disclosure.

An essential role of the Leader Vehicle is to define a path for the formation to follow and then help guide each participant along the way. FIG. 39 depicts an exemplary projection of a path for a platoon to follow, in accordance with the present disclosure. The Leader Vehicle must project a path for each position in the formation, and then define short-term objectives along the projected paths for each vehicle assigned to those positions. The objectives are defined by a set of increasing "look ahead" periods. For example, each vehicle may be given a position, velocity, and heading objective for the following points in time: 0.1 seconds from now, 0.2 seconds from now, 0.4 seconds from now, and 0.8 seconds from now.

Each Follower Vehicle receives the motion guidance information and does its best to achieve the objectives, while maintaining a desirable buffer distance between itself and all other vehicles participating in the formation and other objects and simultaneously attempting to maintain a comfortable ride for occupants and energy efficiency. The motion-control processes will compare the vehicle's current position with future-projected position objectives and determine the fundamental velocity and turning-rate commands for the vehicle's propulsion and steering system to best meet the position objectives and other optimization goals. The Follower Vehicles report their basic position, heading, and velocity information as part of the standard V2V OTA message, and add to it additional feedback including various error terms for the position, velocity, and heading.

The Leader Vehicle may adjust the spacing of positions based on assessment of the position-maintenance performance of each participant vehicle. For example, if a Follower Vehicle is able to maintain its assigned relative position very well, that is, with very small divergences, the Leader Vehicle may guide it to follow at a smaller distance. Conversely, the Leader Vehicle may open additional space in the formation around a participant whose motion includes larger than expected divergences. The position-maintenance assessment includes evaluation in all the following performance metrics: position error (RMS) during each of the following: constant speed driving, driving around a curve, completing an intersection turn, acceleration from a stop, and decelerating to a stop; velocity tracking error (RMS); and heading tracking error (RMS).

Methods as described in FIG. 12 improve the driving experience, including methods to automatically control the vehicle in the presence of likely collision conditions and driver convenience. However, as control methods including methods to determine a position of the vehicle become more accurate and calculations capable of real-time operation in tightly formed platoons, additional benefits become feasible. For example, drafting is a method known wherein close ranges between vehicles are maintained in order to gain aerodynamic advantages, thereby increasing fuel economy or energy efficiency for some or all of the vehicles involved. Additionally, fuel efficiency can be increased and emissions can be decreased by planning vehicle travel along a route, for example, planning vehicle travel and modulating vehicle operation through an intersection with a stop light, timing the cycle and avoiding a vehicle stop. Additionally, a need for a driver in a vehicle is partially or completely eliminated, increased stress and lost productivity associated with the burden of driving, for example, on long daily commutes, are reduced or eliminated. Additionally, as need for a driver in a vehicle is entirely eliminated, age restrictions on vehicle operation can be loosened, for example, allowing a parent to send children to school in an autonomous vehicle without the presence of the parent in the vehicle. Additionally, as urban congestion becomes worse, with traffic jams and related inhibited movement and delays, methods to automatically control vehicle positioning can increase traffic density on roads, allowing automatic, orderly flow of traffic with potentially reduced ranges between vehicles. Total transport capacity of a roadway can be increased by increasing vehicle density and avoiding traffic slowdowns. Additionally, the driving experience can be enhanced, for example, by integrating pedestrian monitoring techniques with vehicle control methods, by enforcing minimum desirable ranges, by automating vehicle responses currently dependent upon operator recognition and response, and by eliminating operator volition to make hurried or impatient traffic decisions. Additionally, autonomous driving methods can be utilized to automatically park and retrieve a vehicle, recharge or refuel a vehicle, send the vehicle for maintenance, pick up parcels, or perform any other similar tasks, while the former occupants of the vehicle independently go about other business, with the vehicle programmed to return at a set time or on command. Additionally, methods described herein increase the reliability of methods to automatically control vehicles, allowing for higher vehicle transit speeds than can currently be employed.

Specific applications of automated control and platooning are envisioned. For example, urbanized areas can use platooned vehicles to implement mass transit in areas without the vast expenditure and footprint required to install a train or subway system. An automated platoon or a platoon led by a driven vehicle, with an operator acting like a bus driver, can make circuitous routes in an urban area, making scheduled stops or drive-bys to load and unload individual vehicles in the platoon. Similarly, trucking companies and mining haul truck operations can also use platoons of automated trucks as a virtual train, reducing the manpower required to man the trucks, reducing the effect of fatigued drivers on the road, and taking advantage of efficiencies such as drafting to more efficiently transfer goods without the investment required by a train line. Military applications are possible, for example, creating platoons of unmanned or lightly manned vehicles to traverse dangerous areas. Law enforcement applications are possible, for example, placing persons in custody in separate and fully locked Follower Vehicles, minimizing contact between potentially dangerous suspects and enforcement officers.

This disclosure describes a set of dynamic platoon formation and management protocols that enables efficient multi-vehicle autonomous driving using low-cost V2V wireless communication, particularly for constrained environments predominantly populated by autonomous vehicles. Programming functionality can enable fail-safe dynamic platoon formation and management. Additionally, programming described enables formation management and changing leader-follower platoon formation for different driving scenarios, exemplary methods of assigning new vehicle to the formation, Leader Vehicle initiated position reassignments within the formation, Follower Vehicle initiated position reassignments within the formation, programming to allow vehicles to leave the formation, and reassignment of Leader Vehicle position to suit different driving scenarios. Additional scenarios include a Follower Vehicle requesting a leadership role, programming to dissolve a formation, managing loss of communication between the vehicles or between a vehicle and an infrastructure system, and scenarios requiring motion coordination guidance.

Many control methods are envisioned utilizing information regarding the operating environment of the vehicle. Many control methods include determining a desirable range for a vehicle to maintain from surrounding objects or targets. Desirable ranges can be defined around a vehicle to describe a desirable envelope in which other objects are not allowed. FIG. 13 depicts an exemplary vehicle and a desirable envelope around the vehicle, in accordance with the present disclosure. Exemplary minimum desirable ranges are defined in four directions around the vehicle and are useful to define an exemplary desirable envelope around the vehicle. Such a desirable envelope can be used to control the vehicle by monitoring object tracks and changing vehicle speed and course to avoid other objects entering the envelope. Additionally, communication with other vehicles can be utilized to coordinate between the vehicles, for example, with both vehicles changing speed and/or course to avoid either vehicle's desirable envelopes from being entered.

Minimum desirable ranges for a vehicle are desirable in controlling the vehicle, as described in methods above. A number of methods to define minimum desirable ranges are known. FIG. 14 describes one exemplary method to formulate a minimum desirable range in front of a vehicle, in accordance with the present disclosure. A minimum stopping time is described to include a time defined by a minimum time to brake, a control reaction time, and additional factors affecting time to stop. A minimum time to brake describes a braking capacity of the vehicle at the present speed. Such a braking capacity can be determined for a particular vehicle through many methods, for example, by testing the vehicle at various speeds. It will be appreciated that braking capacity for different vehicles will be different values, for example, with a large truck requiring a greater time to stop than a smaller vehicle. A control reaction time includes both mechanical responses in the vehicle to an operator or control module ordering a stop and a response time of the operator or the control module to an impetus describing a need to stop. Factors affecting a time to stop include road conditions; weather conditions; vehicle maintenance conditions, including conditions of the braking devices on the vehicle and tire tread; operability of vehicle control systems such as anti-lock braking and lateral stability control. Factors can include a selectable or automatically calibrating factor for occupants in the vehicle, for example, particular driver reaction times and comfort of the occupants of the vehicle with close ranges between vehicles. Time to stop values can readily be converted to minimum desirable ranges by one having ordinary skill in the art.

FIG. 15 depicts operation of an exemplary platoon, in accordance with the present disclosure. A Leader Vehicle 360 and two Follower Vehicles 370 and 380 are depicted driving within lane 350, defined by lane markers 355A and 355B. The three vehicles collectively allow a platoon definition describing the formation and boundaries of the platoon. The Leader Vehicle can operate under manual control or utilize control methods to travel in the lane, and Follower Vehicles can be controlled by various methods. For example, FIG. 15 defines a platoon lane keeping boundary defined by lane keeping boundaries 395A and 395B based upon control methods utilized in the Leader Vehicle, and the Follower Vehicles are controlled to remain within the platoon lane keeping boundaries as the Follower Vehicles trail the Leader Vehicle.

Control methods described herein can benefit operating a group of vehicles as a platoon. Control of other vehicles in a group or platoon can be accomplished according to ranges between vehicles, for example, by control methods in each of the vehicles maintaining ranges as compared to surrounding vehicles and by association from the Leader Vehicle. In another exemplary control method, the Leader Vehicle can monitor vehicles in the platoon and issue commands to each of the vehicles in order to control desired positions of each vehicle within the platoon. In such a system, monitoring the relative positions of vehicles within the platoon is desirable in maintaining desirable positions of each of the vehicles with respect to each other. Additionally, monitoring positions of vehicles within the platoon is desirable in controlling the platoon with respect to the road and objects outside the platoon. Monitoring positions within the platoon can be accomplished according to above described methods, for example, utilizing information acquired from radar and vision systems in various vehicles within the platoon and processing the information to describe a complex model of the various positions of the vehicles and necessary computations required to navigate the platoon. While such a method to control vehicles within a platoon are effective, radar and vision systems in every vehicle can be cost prohibitive. Additionally, nearly constant transmission between the vehicles of complex analyses of ranges and relative relationships of the vehicles can be prohibitive, requiring signals of large bandwidth and requiring nearly flawless reception of complicated signals. In any given communication cycle, loss of any term required for the calculation of a range of a vehicle to the host vehicle disables calculation of the required range. Additionally, the computational load within the Leader Vehicle of controlling numerous vehicles in the platoon through such control methods can be prohibitive.

An efficient method to control vehicles within a platoon from a Leader Vehicle is disclosed, wherein communication based upon GPS coordinates and determined simple values such as ranges and relationships between the vehicles, such as vehicle speed, is utilized. Because the disclosed method allows determination of vehicle location based upon simple GPS coordinates monitored with relation to each of the vehicles within the platoon, determination of necessary calculations within a Leader Vehicle, and communication of simple control terms from the Leader Vehicle to the Follower Vehicles, communication between the vehicles requires less information to be exchanged per communication cycle. Additionally, the method is more robust than communication methods that require large amounts of error-free information to be exchanged in each cycle. Whereas previous methods can be disabled for a communication cycle through the loss of individual values of information, the disclosed method can include simple redundancy. For example, even if a range from a Follower Vehicle to another vehicle in the platoon is corrupted or otherwise not received, a correctly received speed of the Follower Vehicle can act as redundant information, allowing a determination of the probable range of the Follower Vehicle for that communication cycle. Additionally, a Follower Vehicle can report an actual position, actual range, an actual speed, or other terms to allow for correction of determined values in the Leader Vehicle.

One exemplary method to achieve communication between vehicles is to utilize radio signals in a dedicated short range communication format (DSRC). DSRC signals can be utilized in a number of ways. In one exemplary format, a two part signal is transmitted. A first part of the two part signal is dedicated to communications describing a minimum desirable range or desirable envelope to vehicles under independent control from the Leader Vehicle transmitting in DSRC. A second part of the two part signal can be used for other information, for example, controlling vehicles within a platoon. Under one contemplated signal scheme, the two parts of the signal can be transmitted with different signal strengths, with the first part being transmitted with a greater signal strength, in order to most effectively communicate with other vehicles and other platoons not within the control of the platoon of the Leader Vehicle; and with the second part being transmitted with a lesser signal strength, communicating only with vehicles within the platoon of the Leader Vehicle. Different methods of communicating between the vehicles include, for example, communication over a wireless network. While known communication over such networks may not be fast enough to allow for real-time control of vehicles operating at close ranges in a platoon moving at speed, such communication can be used to transmit additional information, for example, occurrence of an expected stop ahead or incoming information regarding an upcoming traffic signal. Additionally, as wireless networks improve and communication over such networks become more timely, methods employed herein can be used over such a network. Additionally or alternatively, laser scanning signals or other forms of data transfer can be utilized to communicate between vehicles, for example, as a method to indicate to the platoon an exigent stop from the Leader Vehicle. Many forms of communicating between vehicles within a platoon are contemplated, and the disclosure is not intended to be limited to the particular methods described herein.

GPS systems, as described above, allow for good precision in locating a group of vehicles in close proximity with relation to each other. By accurately locating one vehicle in the platoon, GPS information on the remaining vehicles can be utilized to precisely relatively locate other vehicles in the platoon as compared to the location of the accurately located vehicle. Additionally, GPS information including a coordinate describing a location of a vehicle is much simpler to transfer between vehicles and requires much less computational load than relationships determinable by other methods, for example, computations based upon radar and vision information in each Follower Vehicle. Additionally, because GPS data is available in and for each of the Follower Vehicles, commands to the Follower Vehicles accomplishing maintaining positions within the platoon can be greatly simplified, commanding the Follower Vehicles according to position or range instead of detailed control of the vehicle through the communication signal. By controlling a Leader Vehicle and utilizing GPS information describing relative locations of various Follower Vehicles, control of the Follower Vehicles can be achieved with minimal communication between the vehicles.

Operation of a platoon of vehicles requires an ability to control each of the vehicles according to a selected platoon formation. Additionally, operation of the platoon requires an ability to navigate the platoon over roads and in the context of other vehicles, traffic signals, and other objects and obstacles required to move all of the vehicles in the platoon. As described above, communication between the vehicles or V2V communication enables a method to control vehicles within the formation and enables communication of the platoon with other vehicles on the road. Additionally, vehicle-to-infrastructure (V2I) communication enables the platoon to acquire information from and communicate with systems external to the platoon. As described above, location of a vehicle can be determined through the use of expensive and computationally intensive methods utilizing combinations of in-vehicle systems such as GPS, radar, cameras, ultrasonic ranging, and other devices. Known methods to integrate sensor inputs include protocols such as the well known Simultaneous Localization and Mapping (SLAM)—a smart single vehicle navigation process. While such protocols or programming can be effective in controlling a vehicle in certain circumstances, they can be computationally intensive and costly to implement in large number of vehicles. An exemplary limitation in such programming includes presence of considerable latencies in determining and initializing appropriate autonomous vehicle responses when other vehicles or objects are encountered at intersections or enter the path of the vehicle being controlled. Sensor based control systems need to cooperatively detect and classify objects and their dynamics with some certainty before reacting to such constantly changing environments, which contributes to delay. However, through use of V2V and V2I communications, methods to locate and control the vehicle based upon the determined location can be made less expensive and less computationally intensive. A communication-based approach shares every vehicle's information and dynamic state in advance with all connected vehicles, thereby giving plenty of time for control modules to plan and adapt vehicle motion to dynamic traffic environments. This property of V2V and V2I communication-based approach makes the vehicle formation and platoon management tasks manageable. Additionally, reduction in the number of components required to operate a vehicle in a platoon can increase the availability of the systems, such that the methods can become commonly employed in all vehicles rather than being a select expensive feature.

Methods described above allow for control of a platoon of automated vehicles. However, it will be appreciated that manually controlled vehicles can utilize a platoon formation. However, instead of fully automated control, the operator can retain some or all of the vehicle's control. For example, a Follower Vehicle in a platoon can operate similarly to a vehicle utilizing ACC, a method described above, with an automatic vehicle speed control maintaining a range from the vehicle being controlled to a vehicle in front of the vehicle being controlled. In such an application, the operator can retain control of the lateral steering of the vehicle. It is recognized that formations calling for close ranges between vehicles can be disconcerting to an operator. A display to the operator can be utilized to reassure the operator when the operator's vehicle being driven is within a desired "green zone" (for better fuel efficiency) or is within a desired but still desirable range from the vehicle in front of the operator's vehicle. In fully manual operation, a display, for example a set of lights, a display upon the instrument panel, or a heads up display can be utilized to indicate a desired range to the operator to maintain ranges required by the platoon. In such an application, the driver can maintain control of the speed and lateral control of the vehicle, but a braking assist module, overriding manual control when required to brake the vehicle, can be utilized to allow closer ranges between vehicle than would be normally advisable in manual operation.

Methods described herein allow for automated control of vehicles in a platoon. However, some minimum equipment is required to control a vehicle within the platoon. For example, V2V communication is required to allow definition of desired but desirable ranges within the platoon. Vehicles without any ability to monitor range and position within the platoon cannot operate as a Follower Vehicle within the platoon.

Automated control of a vehicle allows a vehicle to operate as an individually operable vehicle or as a member of a platoon, allowing the operator or occupant of the vehicle to remove attention from the road and allow the control system to operate the vehicle. However, it will be appreciated that automated control of the vehicle can be achieved independently of the occupant's presence of the vehicle. For example, a vehicle can transport an occupant to work; automatically park and pay any fees through a V2I exchange utilizing, for example, an established credit account; at a designated time travel to a maintenance shop, a carwash, a grocery store, a restaurant, or any other establishment and perform any task enabled by the owner or former occupant of the vehicle; and return to a designated position at a designated time to pick up the occupant at the end of the workday. In the alternative, unmanned vehicle operating as taxi service could be operated by a municipality. In another example, high density parking facilities could be operated, for example, with vehicles being arranged tightly within the facility and traversing a maze within the facility, emerging from the facility by a required time entered by the operator or occupant. In any parking application, the vehicle could spend some of the time parked in a recharging facility, replenishing the energy storage device of the vehicle. Automated operation of vehicles could enable a few recharging stations within a parking facility to recharge the various vehicles within the facility, with the vehicles taking turns at the recharging stations. These are exemplary descriptions of how such an automated vehicle could be used. A great number of such uses are envisioned, and the disclosure is not intended to be limited to the particular embodiments described herein.

Automated control of a vehicle allows simple entry of a destination or other instructions as the method to operate the vehicle. Designation of destinations, waypoints, or tasks for an automated vehicle can be entered through any number of methods. For example, an occupant can retain possession of a human machine interface device (HMI) in order to retain control of the vehicle. Such a device could include a convenient form, with a device resembling and/or unitary with common hand-held devices, such as a cell phone, a navigation device, or a digital assistant/pocket computer. Such a device could utilize key entry of commands; voice commands; touch screen commands; accelerometer activated commands; GPS location of the device, for example to coordinate location of the occupant with the unoccupied vehicle based only upon the location of the device; periodic synchronization or alternative control through a standard computer interface; control through a plurality of similar devices, for example, with a child and parent both having controllers with appropriate authority and monitoring ability in the parent's controller; or any other form of control device.

Interactivity of an automated vehicle or a platoon of vehicles with infrastructure devices enables a number of beneficial advantages to vehicle operation. For example, intersections utilizing stop lights can include broadcasted schedules describing when the light will be green or red. Such a broadcast can enable vehicles approaching the intersection to modulate speed, for example, slowing the vehicle such that the vehicle will cross the intersection as the light turns green, thereby by-passing the need to stop and incur all of the inefficiencies associated with stopping and subsequently accelerating the vehicle. Platoons can likewise monitor light cycles in order to enable the entire platoon to navigate the next green light period without breaking up the platoon. Communication with a traffic light can be two-way, for example, enabling a local traffic authority to extend green light periods at the reasonable request of a platoon, thereby enabling higher fuel efficiencies. In another example, traffic lights can be disabled or not used in areas wherein only automated vehicles are used, with each vehicle monitoring traffic moving through the intersection and negotiating a path and speed of transit through the intersection with the other vehicles. Such a system could be enabled by giving control of other vehicles, for example, to the vehicle closest to the intersection. An alternative control scheme could be utilized modeling interaction of people walking through a crowded square or fish traveling in a school. In the alternative, a virtual platoon could be established, for example, with minimal management from an infrastructure device, with boundaries at some set distance from the intersection in every direction and instructions to each vehicle modeling a morphing platoon formation, with position assignments as described in FIG. 19 and here-throughout being utilized to guide vehicles through the intersection. Such a virtual platoon would cascade vehicles through the intersection, with defined positions guiding vehicles one-by-one through the intersection. According to these exemplary methods, control of vehicles through an intersection can include wireless communication between vehicles, including communicated positions of all of the vehicles, and control of the vehicles remaining local to the vehicles. In another example, control of platoons of vehicles through an intersection can include wireless communications between the platoons, including communicated positions of all of the vehicles within the intersection, and control of the platoons of vehicle remaining local to the platoon Lead Vehicles. In another example, an infrastructure device in wireless communication with all vehicles and platoons within the intersection, can control or send controlling commands to vehicles through the intersection. An intersection can include a traffic signal, stop signs, a traffic circle, or any other methods to control traffic through a complicated road geometry. A number of methods to control vehicles through intersections and other complicated road geometries are envisioned, and the disclosure is not intended to be limited to the particular exemplary embodiments described herein.

Vehicles utilizing V2V and V2I communication techniques are necessarily highly connective devices. For example, use of a wireless connection to augment navigation and control are likely to enhance use of the described vehicles. Social networking and other interaction are known and widespread over internet and wireless devices. Automated control of a vehicle combined with time spent in a connective and mobile device enables an occupant to engage in social activities within the vehicle. For example, a person could coordinate formation of a platoon every day with a group of social acquaintances. Connectivity between the vehicles could allow for reading groups, computerized games, or any other social activity over monitors in the various vehicles. In the alternative, an operator could search for a group of potentially unknown persons traveling along a similar route and suggest formation of a platoon. Additionally, such searches for potential members of a platoon could be screened for driving preferences, for example, discriminating according to preferred vehicle speed, preferred distances between vehicles, and preferred platoon formation. In another example, a person at different locales within an urban area could identify when friends are driving, allowing real-time communication between the person and the friends. Such real-time communication could allow for spontaneous social opportunities not contemplated before the conversation. Such opportunities could be augmented, routes planned, and plan coordinated using maps and internet content within the vehicles. Routes could include the vehicles meeting and creating a platoon at some point prior to reaching an intended destination.

Commands from the Leader Vehicle to Follower Vehicles are needed for effective control and management of the platoon. Platoons, in order to effectively benefit the various occupants of the vehicles, must share a common travel plan. Numerous methods can be envisioned to create a common travel plan. Platoons can be formed at the start of a route with a set of known vehicles, and all vehicles can travel according to a single travel plan. In the alternative, vehicles can join and leave the platoon in route, with the common travel plan taking into account an efficient or selectable joint travel plan, with platoon members meeting, traveling together, and members departing at points on the joint travel route. Common travel plans can be developed spontaneously in travel, for example, with three distinct vehicles traveling on the same road determining a common set of waypoints through which a platoon would be beneficial. Forming and managing platoons can be entirely automatic, with the occupant never selecting a platoon, and a computerized management program searching for acceptable platoons to join or platoon members to invite in transit to a common travel plan. Vehicles can communicate directly with other vehicles on a roadway to search for likely platoon options. Additionally or alternatively, infrastructure systems can be utilized, for example, through internet access, to search vehicles on a given road or scheduled later to travel on a stretch of road to form proposed platoons sharing a common travel plan. Many uses of common travel plans are envisioned, and the disclosure is not intended to be limited to the particular embodiments described herein.

Platoon formations are controlled, for example, by commands from the Leader Vehicle to each of the Follower Vehicles. FIG. 16 schematically depicts an exemplary in-vehicle platooning control system, in accordance with the present disclosure. Platooning control system 400 includes an autonomous controller 410, an HMI device 420, a motor controller 430, a GPS device 135, and a DSRC system 440. Autonomous controller 410 including a processor can be operated in a Leader Vehicle, receiving data from each of the Follower Vehicles through DSRC system 440, GPS data from GPS device 135, and any other required information, and controller 410 performs the necessary calculations to determine appropriate control commands to each of the Follower Vehicles. These commands can then be sent to the Follower Vehicles through DSRC device 440. Similarly, autonomous controller 410 can be operated in a Follower Vehicle, receiving instructions from a Leader Vehicle through DSRC system 440 and issuing commands to vehicle control systems according to the received instructions. HMI device 420 is an interface device allowing an operator to issue commands, enter navigational information, or otherwise provide input to the system. Motor controller 430 receives control messages from autonomous controller 410 and HMI device 420, and issues commands to electric motors providing motive force and steering control to the vehicle. Motor controller 430 is an exemplary powertrain controller, and it will be appreciated that motor controller 430 could be replaced with controllers to operate any one or more of powertrain, steering and braking systems, including hydraulic or electric steering, internal combustion engines, electric motors, fuel cells, hybrid drive controls, regenerative or friction brakes, or any other similar system. Such controllers may generally be referred to herein as propulsion controllers. Control module, module, control unit, controller, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. A controller may have a set of control algorithms, including resident software program instructions and calibrations stored in memory and executed to provide the desired functions. The algorithms are preferably executed during preset loop cycles.

Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing vehicle operation. Alternatively, algorithms may be executed in response to occurrence of an event.

A method to monitor vehicle positions within the platoon includes communicating a relative small amount of information from the Follower Vehicles to the Leader Vehicle, determining commands including desired vehicle positions within the platoon, and utilizing those determined commands to operate the Follower Vehicles. Determining commands includes determining ranges or distances necessary to effectively operate the platoon. These distances can include inter vehicle distances within the platoon, and can also include determination of a region that the platoon needs to effectively operate, or a desirable platoon envelope.

Close leader-follower autonomous vehicle formations can utilize in-line and side-by-side positions in a formation. FIG. 17 depicts an exemplary platoon formation, in accordance with the present disclosure. As described above, V2V communication in the disclosed system is advantageous over known systems in that the communications between the vehicles can be limited to simple terms, describing ranges and relationships between the vehicles. All vehicles are capable of exchanging a set of critical data throughout the platoon, in particular, conveying commands from the Leader Vehicle to a Follower Vehicle or reporting actual values from the Follower Vehicle to the Leader Vehicle. Critical data can include the some or all of the following exemplary list: position, latitude, longitude, altitude, heading, speed, longitudinal and lateral acceleration, brake status, path history, travel plan, vehicle size, vehicle type, current operating mode (autonomous or manual), and other platoon control data. Vehicles can additionally receive traffic signal information, map data, and GPS augmentation signals from infrastructure devices and transmit such information between vehicles as appropriate. Vehicles can additionally broadcast advanced information regarding upcoming maneuvers, for example, a detected traffic stop some distance ahead or a blocked lane of travel.

Referring to FIG. 17, a Leader Vehicle L and Follower Vehicles $F_1, F_2, \ldots F_r, \ldots F_n$ are depicted. Between L and $F_1$, a longitudinal range $D_1$ is defined. Similar ranges are defined between different longitudinally spaced vehicles. In addition, $D_{LAT1}$ is defined describing a lateral distance between different vehicles positioned side-by-side. By defining these terms, basic locations of positions within the platoon can be defined and controlled.

In controlling platoon formations, determining desired inter-vehicle spacing in real-time according to increased fuel savings, and occupant preferences is one task for autonomous vehicle platooning operation. The system must determine following distances, positions, and desired driving speeds for enhanced driving experiences and fuel efficiency for all vehicles in the platoon. In automated control of vehicles, these values can be conveyed directly from the Leader Vehicle to the controlled Follower Vehicles. In manually operated Follower Vehicles, a green zone can be defined, instructing or aiding the operator to keep the vehicle within the desired positional relationship to a lead vehicle based upon such criteria as fuel economy.

It will be appreciated, in automated control of vehicles in a platoon by a Leader Vehicle, that each Follower Vehicle must be commanded based upon a desired behavior or a desired position of the Follower Vehicle. However, control of the Follower Vehicles is imperfect, and in terms of safe or fuel efficient distances between the vehicles, it is the actual distances between the vehicles that are critical to operation of the platoon. Referring, for example, to FIG. 17, lead vehicle L can command to Follower Vehicle F1 a position based upon the GPS location of Leader Vehicle L. As described above, precision of GPS locations within a group of vehicles located proximately is high. Therefore, a commanded position to Follower Vehicle F1 based upon distance D1 and the GPS location of Leader Vehicle L can be used to control Follower Vehicle F1. However, a commanded position to Follower Vehicle F2 cannot be based upon the commanded position to Follower Vehicle F1, but must instead be based upon the actual position of its lead vehicle, Follower Vehicle F1, directly in front of Follower Vehicle F2 as the actual position is reported by Follower Vehicle F1 to the Leader Vehicle L. Similarly, a commanded position to Follower Vehicle Fr must be based upon an actual position of its Leader Vehicle, Follower Vehicle F2, as the actual position is reported by Follower Vehicle F2 to the Leader Vehicle L.

In order to accomplish these control functions, the platoon Leader Vehicle calculates real-time relative platoon position vectors and speeds for each Follower Vehicle in the group ensuring the best possible fuel savings and desirable operation. Exemplary calculations include selecting the best possible inter vehicle distance ($D_g$) for a known platoon position, for example, based on vehicle type, calculating a minimum desirable distance ($D_s$) between a Follower Vehicle and a preceding vehicle directly in front of the Follower Vehicle, and determining a maximum of $D_g$ and $D_s$ as the desired platoon distance (D) between the preceding vehicle directly in front of the Follower Vehicle and the Follower Vehicle. $D_s$ can be calculated considering following: current V2V wireless communication quality (e.g., channel congestion, packet error rate); current vehicle positioning and sensor data accuracy; vehicle size and shape parameters, such as length, cross sectional area, bumper height; current and predicted vehicle speeds; dynamic capability of individual vehicles in the platoon (e.g., braking, acceleration, control error, latency); current road geometry; road surface; weather conditions; and current driving mode (manual or autonomous. Exemplary computation of $D_s$ will be described in greater detail below.

Once D is calculated for a particular Follower Vehicle, the Leader Vehicle calculates a commanded position to transmit to the Follower Vehicle, for example, as described above, based upon the actual position of the Leader Vehicle of the particular Follower Vehicle, D, and other factors such as lane geometry and the formation of the platoon. The Leader Vehicle can use wireless communication, such as the DSRC system described above, to periodically transmit this information to the Follower Vehicles. Each Follower Vehicle receives the relative position vector and speed from the platoon Leader Vehicle and use that information as targets or set points for the steering, position and speed control values for use by each vehicle's control systems.

It will be appreciated that the above system, describing the Leader Vehicle making all calculations for the Follower Vehicles is an exemplary form that the disclosed system can take. For example, alternatively, the individual Follower Vehicles can calculate individual platoon distances for themselves based on the travel plan, vehicle, and control commands received from platoon Leader Vehicle, with the Follower Vehicle determining deviations from a preferred platoon configuration based upon other inputs, such as lane availability or inputs from the occupant.

As described above, Follower Vehicles can report back actual position, speeds, platoon distances, and other information to the Leader Vehicle and other members of the platoon in every control or communications cycle. In one exemplary system, a control cycle is operated at approximately 20 Hz.

It will be appreciated that one system limitation, wherein Follower Vehicles compute their own commands, includes potential that a Follower Vehicle in close formation with a Leader Vehicle will not be able to react in time to abrupt changes in operation of the Leader Vehicle. By determining platoon control commands in the Leader Vehicle, the operation of the Leader Vehicle can be taken directly into account such that that commands issued to the Follower Vehicles will include adequate time for the Follower Vehicles to react to the Leader Vehicle. Similarly, by determining instructions for each of the Follower Vehicles in the Leader Vehicle, unpredictability in each of the Follower Vehicles can be minimized, reducing the impact to the remaining Follower Vehicles and allowing closer spacing between the vehicles than would otherwise be allowable.

Fuel saving benefits in vehicle platoons, also known as drafting behind vehicles, is a well-researched area. All vehicles (not just following ones) in close following platoons share this benefit. Research has shown that vehicles interior to a formation gain the most benefit from platooning and will consume 10% less fuel at closest spacing, and the rearwardmost trailing vehicle saves about 7% at closest spacing. For platoon gaps less than 1.5-2 meters, a leading vehicle also consumes less fuel than its trailing vehicle. This saving in fuel consumption results from reduced aerodynamic drag in tandem operation compared to isolated operation.

Figure 21:
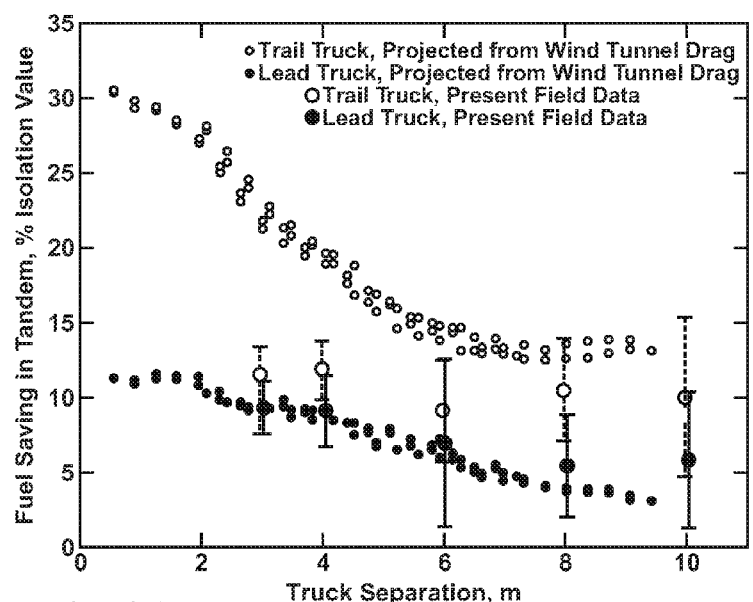
FIG. 21 graphically depicts exemplary fuel efficiency savings realized in drafting as a function of separation distance, in accordance with the present disclosure.
Figure 22:
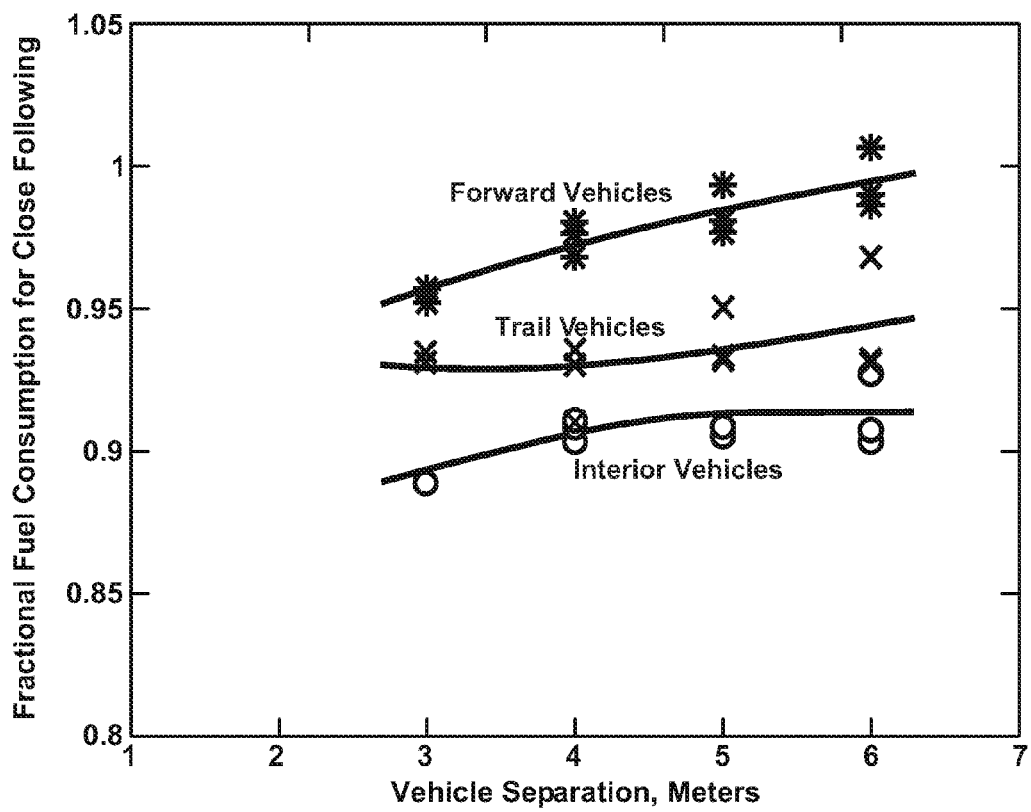
FIG. 22 graphically depicts exemplary fuel consumption rates as a function of position within a platoon and vehicle separation distances, in accordance with the present disclosure.
Figure 23:
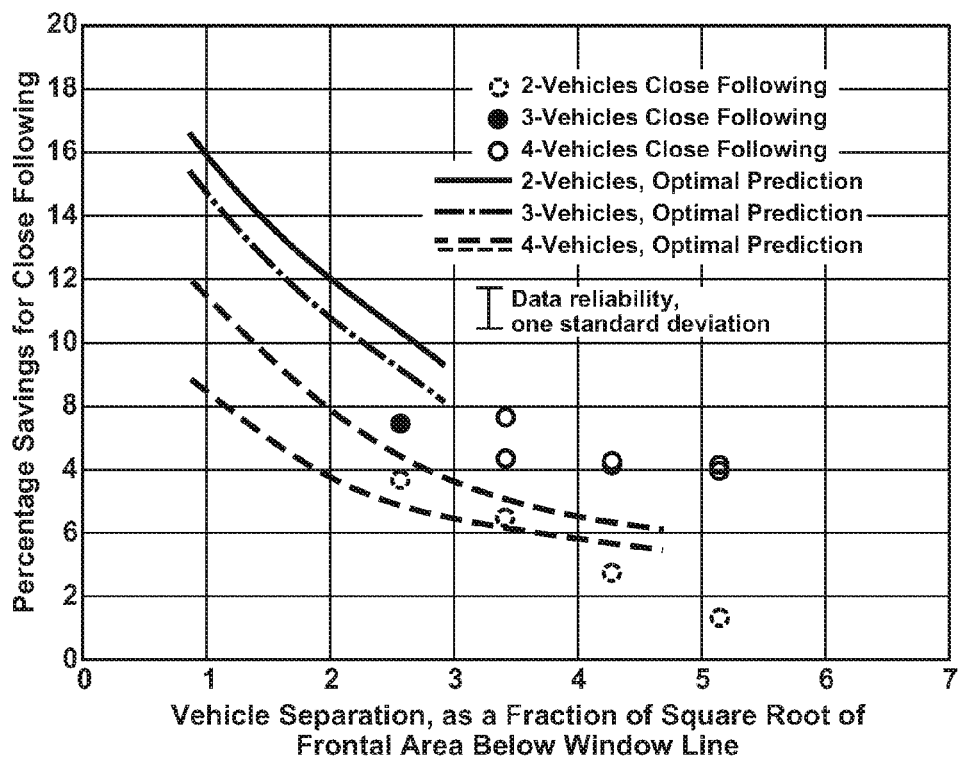
FIG. 23 graphically depicts exemplary fuel consumption as a function of vehicle separation distances and a fraction of square root of frontal area, in accordance with the present disclosure.
Figure 24:
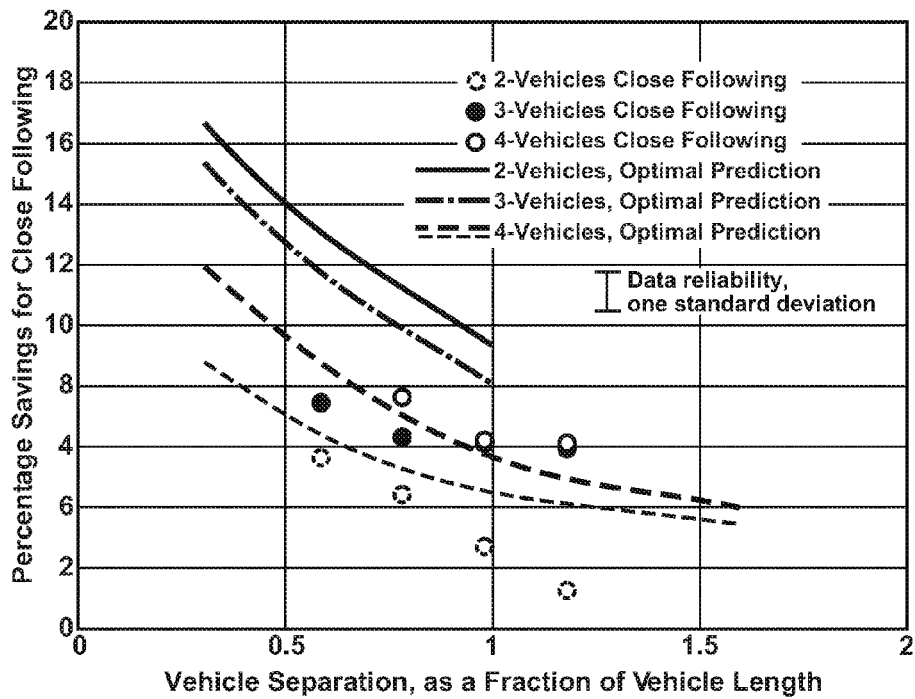
FIG. 24 graphically depicts fuel consumption as a function of vehicle separation as compared to vehicle length, in accordance with the present disclosure.

FIG. 21 graphically depicts exemplary fuel efficiency savings realized in drafting as a function of separation distance, in accordance with the present disclosure. FIG. 22 graphically depicts exemplary fuel consumption rates as a function of position within a platoon and vehicle separation distances, in accordance with the present disclosure. FIG. 23 graphically depicts exemplary fuel consumption as a function of a fraction of square root of frontal area, in accordance with the present disclosure. FIG. 24 graphically depicts fuel consumption as a function of vehicle separation as compared to vehicle length, in accordance with the present disclosure. FIGS. 21-24 clearly depict that fuel savings can be realized by operating vehicles in close formation and in platoons. Exemplary equations describing projected fuel efficiency for tandem operation can be expressed in the following relationships:

$$\% \text{ fuel savings} = \xi * \left[\frac{\Delta C_D}{C_D}\right] \quad [1]$$

$$\xi = \frac{0.89}{1 + \frac{[0.031 r_0 + 0.000126]}{C_D A / M}} \quad [2]$$

where, $\left[\frac{\Delta C_D}{C_D}\right]$ = the percentage improvement in drag coefficient measured for tandem operation, $\xi$ = the efficiency factor, $C_D$ = drag coefficient, $A$ = cross sectional area, $M$ = air mass, and $0.031 r_0$ = rolling resistance.

Control commands from the Leader Vehicle give instructions to Follower Vehicles regarding formation distances, formation positions, and other commands relative to managing the platoon. However, local control of a vehicle can be used to augment instructions from the Leader Vehicle or take control of the Follower Vehicle in the case of an exigent situation. For example, if the occupant of a particular vehicle feels that the range to another vehicle is too close, a command from the occupant can be observed to modify range commands from the Leader Vehicle. If the occupant of a Follower Vehicle observes an exigent situation, and enters a steering or braking command, the Follower Vehicle can be commanded to break formation in response to the exigent situation. In either circumstance, the DSRC system can be utilized to simultaneously transmit the change in commands in the Follower Vehicle to the rest of the platoon so appropriate reactions can take place.

Each Follower Vehicle receives the relative position vector and speed from the platoon Leader Vehicle and use that information as targets (set points) for the steering, position and speed control processes. Alternatively, the individual Follower Vehicles may calculate individual platoon distances for themselves based on the travel plan, vehicle, and control commands received from the platoon lead.

Figure 25:
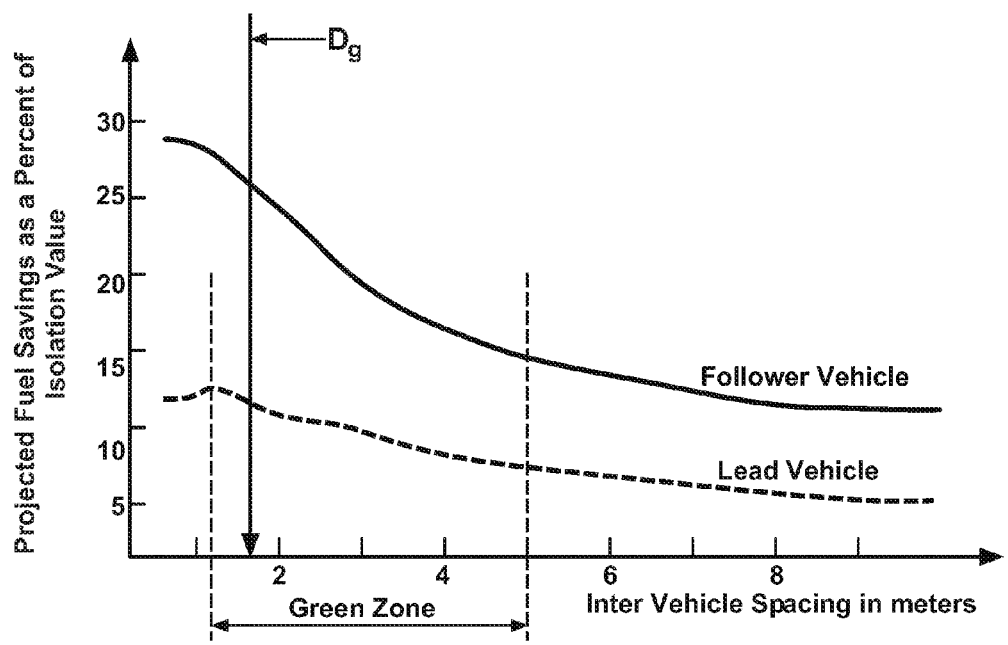
FIG. 25 graphically depicts a method for selecting a desired range from a Follower Vehicle to a Leader Vehicle, in accordance with the present disclosure.
Figure 26:
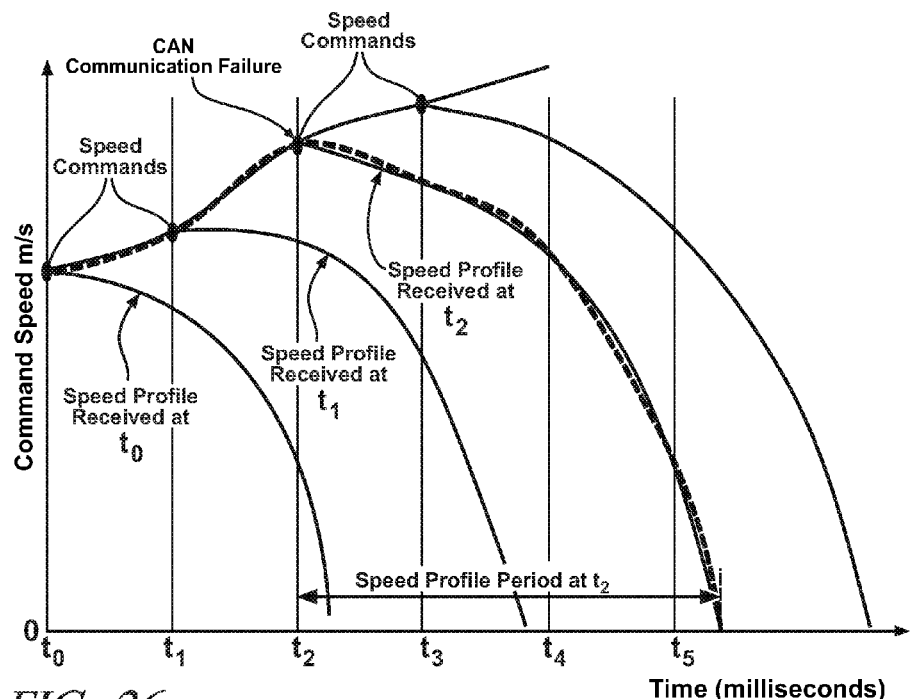
FIG. 26 graphically depicts utilization of an exemplary fail-safe speed profile, in accordance with the present disclosure.

FIG. 25 graphically depicts a method for selecting a desired range from a Follower Vehicle to a preceding vehicle directly in front of the Follower Vehicle, in accordance with the present disclosure. Data depicted in FIG. 25 was collected from exemplary wind tunnel testing. A green zone of acceptable range values is defined, selected according to formation preferences described above. Operation within such a green zone can be selectable by the operator of the vehicle, selected automatically by preferences input to a controller, or by other methods. A green zone can be defined in a number of ways depending upon the priorities of the platoon or the vehicle involved. In one exemplary embodiment, a green zone can be identified by a minimum spacing at $D_s$ and a maximum spacing resulting in a 5% fuel savings. In another exemplary embodiment, the minimum spacing can be defined by $D_s$ multiplied by some factor based upon the operator comfort level with short following distances or based upon weather, visibility, or road conditions. In one embodiment, the green zone can be utilized to indicate a proper following distance to an operator manually operating the vehicle following the other vehicle. In such an embodiment, an exemplary minimum spacing can be defined by $D_s$ times a reaction time factor. Within this green zone, a method to select $D_g$ for a known platoon position and vehicle. In one exemplary method, both vehicle length vs. fuel savings and cross section vs. fuel saving calibration curves can be referenced, accessed by look up tables embodying information such as contained within FIGS. 22-25. The look up tables and calibration curves to determine $D_g$ can be developed experimentally, empirically, predictively, through modeling or other techniques adequate to accurately determine vehicle operation, and a multitude of look up tables and calibration curves might be used by the same vehicle for different powertrain settings, environmental conditions, or operating ranges. FIG. 25 graphically depicts exemplary selection of $D_g$ in relation to a range of potential choices within a defined green zone, in accordance with the present disclosure.

$D_s$ is the minimum distance between a preceding vehicle directly in front of a Follower Vehicle and the Follower Vehicle based on minimum desirable distance, calculated by considering real-time data as below. A number of factors affecting a following distance can be described, including factors affecting communication of commands within the platoon, factors affect accurately monitoring the positions of vehicles within the platoon, speeds of vehicles within the platoon, operating characteristics of vehicles, including acceleration and braking, weather, and road conditions. $D_s$ can be determined from the following exemplary equation:

$$Ds=(N*V)/f+\delta D+\delta 1*V+\delta 2+\delta 3+\beta \quad [3]$$

The term f describes a frequency of V2V communication. It will be appreciated that f is important to setting $D_S$, in that smaller f describes a greater communication lag requiring increased $D_S$ in order to maintain a preferred distance between vehicles. The term V describes platoon vehicle speed differentials or the difference between speeds of different vehicles within the platoon. Small values of V mean that the relative speeds of the various vehicles are small, indicating controlled operation of the platoon and smaller allowable $D_S$ values. Larger values of V indicate that the formation of the platoon is not stable and that larger values of $D_S$ are advisable based upon the instability. The term N can be an integer and describes a probability that a vehicle in the platoon will receive a transmitted packet from the lead vehicle. The term $\delta D$ describes a difference in minimum stopping distances between Follower Vehicles and a corresponding preceding vehicle directly in front of the Follower Vehicle. The term $\delta 1$ describes an estimated computational latency. The term $\delta 2$ describes a sum of control and relative position error differentials. The term $\delta 3$ describes an extra margin that can be implemented for bad weather or difficult road conditions. As disclosed herein, the methods described herein can be utilized to automatically control the vehicles of the platoon. However, it is also described that the methods disclosed can be utilized with manually operated vehicles. The term $\beta$ can be utilized to describe a driver reaction time. $\beta$ can be a calibrated value, can be selected by an operator, can be a value set automatically based upon measured reaction times of the operator of the vehicle, or can be set by any other method contemplating operator reaction times. Accord to one exemplary embodiment, for 30% DSRC packet error rate (PER) @ 300 m range, the number of consecutive packet transmissions (N) required to achieve the packet reception probability P at vehicles is given by the following relationship.

$$P=1-PER^N \quad [4]$$

E.g., N=4 for 99.2% probability of reception, and
N=3 for 97.3% probability of reception.
From $D_g$ and $D_s$, a selected range to control a vehicle can be determined according to the following equation.

$$D=Maximum (Dg,Ds) \quad [5]$$

By selecting a maximum of $D_g$ and $D_s$, $D_g$ will be selected unless it violates the minimum desired distance.

Multiple methods of controlling a platoon in relation to surrounding conditions on a roadway are envisioned. FIG. 13 shows a method to control a vehicle in relation to surrounding conditions on a roadway using a desirable envelope. A similar method can be employed with a platoon of vehicles. By evaluating positions of vehicles within a platoon and applying minimum desirable ranges from all of the current vehicle positions, a desirable envelope can be defined. By controlling the platoon according to a desirable envelope, the platoon can be navigated.

Figure 27:
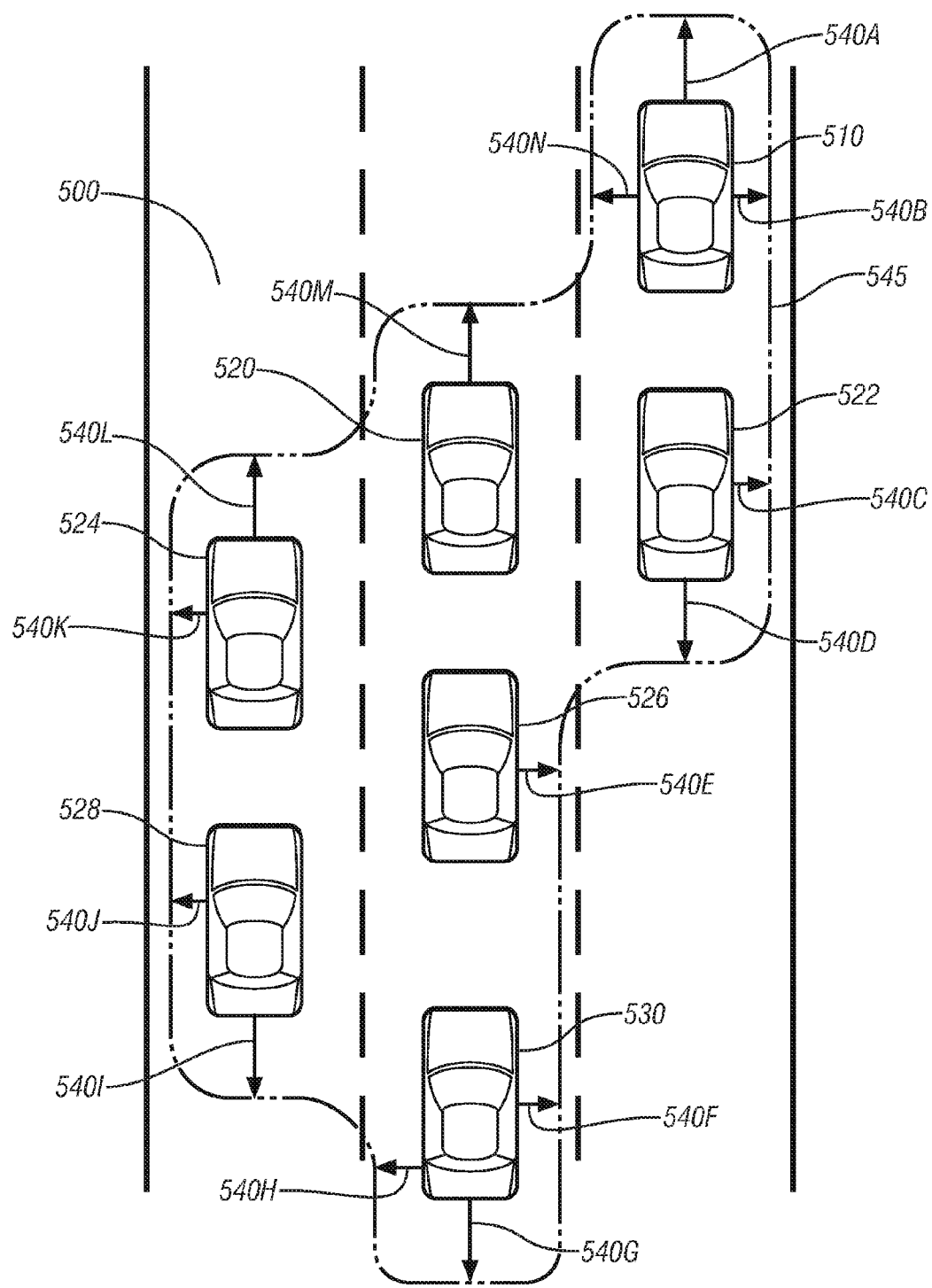
FIG. 27 depicts operation of an exemplary desirable envelope around a platoon of vehicles, in accordance with the present disclosure.

FIG. 27 depicts operation of an exemplary desirable envelope around a platoon of vehicles, in accordance with the present disclosure. Leader Vehicle 510 and Follower Vehicles 522, 524, 526, 528, and 530 are depicted traveling in formation on roadway 500. Minimum desirable ranges can be determined for each of the vehicles. As described above, minimum desirable ranges between the vehicles of the platoon are useful to define the distances maintained within the formation. However, minimum desirable distances for vehicles with a side facing outwards from the formation can be used to describe the desirable envelope for the platoon. Minimum desirable ranges for the vehicles with a side facing outwards from the formation of FIG. 27 are depicted as distances 540A through 540N. These distances are used to formulate platoon desirable envelope 545. In this way, details regarding the desirable operation of the many vehicles within a platoon can be used to navigate the entire platoon.

Minimum desirable distances around a platoon, as depicted by distances 540 in FIG. 27, can be handled according to a number of exemplary methods. According to one exemplary method, a desirable platoon envelope (PSE) can be determined, and identified or imminent violations of the PSE can be alerted.

It will be appreciated that shape and size of the PSE can be statically set. In another embodiment, the shape and size of the PSE can change dynamically based on a number of factors affecting platoon operation. These factors can include a number of vehicles in the platoon; a speed of the platoon; platoon vehicle speed differentials; a determined accuracy of vehicle positioning, for example, quantifying variability in GPS positions; a wireless communications quality; dynamic capabilities of the vehicles inside the platoon, for example, including acceleration, braking, and controllability; a current travel plan; a geometry of the current roadway including curvature of the roadway; a condition of the road surface; and weather conditions. Additionally, desirable envelopes for the platoon can be dynamic, adjusting to changes in formations. A position of a particular vehicle and related ranges can be increased based upon a planned maneuver within the formation or changes to the shape of the overall formation.

Benefits are apparent to utilizing a navigation method such as a platoon desirable envelope. For example, enhanced platoon-wide driving experiences can be achieved by detecting interactions with vehicles and objects outside the platoon perimeter with a limited number of sensors utilized around the perimeter of the platoon, thereby reducing non-communicating sensors on individual vehicles within the formation. Use of platoon desirable envelope in the standard V2V message reduces the collision avoidance program complexity and computational load for all V2X (i.e., V2V and V2I) equipped vehicles. Decreased complexity in sensors utilized and reductions in collision avoidance programs allows the platoon to efficiently utilize communication network resources (i.e., wireless bandwidth). For example, broadcasting platoon-wide V2V messages can be transmitted per group of vehicles, thus reducing the wireless channel congestion issues. Additionally, dynamic desirable bubble size can be used to regulate the transmission power for packets intended to transmit inside the platoon and outside separately, further reducing the wireless channel congestion issues. The use of a single platoon desirable envelope in the standard V2V message and including the platoon size parameters in this message, instead of including individual vehicle sizes, acts to reduce computational latency and load on V2X equipped vehicles and save wireless bandwidth. In this way, the use of a platoon desirable envelope in the standard V2V message reduces the collision avoidance process complexity and computational load for all V2X equipped vehicles.

Use of a platoon desirable envelope can facilitate a number of navigation functions of the platoon. For example, the desirable envelope can be taken into account within an automatic traffic signal intersection navigator program, modulating platoon operation or making requests to a traffic signal based upon desirable minimum distances for the vehicles of the platoon. Similarly, a four-way stop sign traffic intersection navigator can utilize the platoon desirable envelope to control navigation of the platoon with maximum efficiency. Obstacle detection and avoidance programs can utilize a desirable envelope in a number of ways. For example, if an obstacle is detected in a particular lane to interfere with some portion of the platoon, the formation can be adjusted to make certain that the desirable envelope is not violated by the obstacle. In the event that an obstacle is dynamic, for example, a vehicle in front of the platoon slowing and indicating a turn outside of the path of the platoon, only vehicles that will have minimum desirable ranges predictably impacted by the dynamic obstacle need to be adjusted. If a column of five vehicles exist in the particular lane, but a prediction is made that only the first two vehicles in the column will be affected by the dynamically changing obstacle, room can be made in the formation for the two vehicles to switch lanes, while the remaining three vehicles in the column can be maintained in their current positions in the formation. Upon the change, the platoon desirable envelope can be reformulated, and reactions can be made if the dynamically changing obstacle fails to follow the predicted behavior.

Similarly, programs for exigent situation handling within the platoon can utilize desirable envelopes to manage reactions within the platoon. For example, if a vehicle in another lane makes a lane change, and upon the desirable envelope being violated or an incipient violation, an appropriate evasive reaction can be initiated, such as a stop command or immediately returning sensor duties and control of the affected vehicles to the vehicle controls.

A Leader Vehicle can utilize a number of methods to define the positions for Follower Vehicles to utilize. One exemplary method includes message propagation using path history of the Leader Vehicle and defining positions as relative to the path history. By using the platoon lead's path history as "state commands" to the Follower Vehicles, the courses defined for the various Follower Vehicles can be easily defined and maintained within a defined clear path or paths while avoiding complex computations required to constantly monitor the position of each vehicle in free space and control each path individually.

A method to manage communications internal to a vehicle includes managing communications within a CAN operating between various components of the control system of a vehicle, particularly communications of control messages from the autonomous controller to the motor controller. A control message includes a speed profile utilized to control propulsion of the vehicle. The speed profile includes both a current speed command representing an instantaneous desired speed of the vehicle, for use in the absence of a communications anomaly (e.g. normal communication), and controlled future speed commands for controllably reducing speed through a speed profile period, for use in the case of a detected communications anomaly (e.g. complete, partial, delayed, corrupt, etc. control message). The controlled future speed commands are generated based upon a number of factors in the absence of further communication from the autonomous controller to the motor controller system. Exemplary factors that can be used to generate the controlled future speed commands include a current position of the vehicle, a current velocity of the vehicle, a current acceleration of the vehicle, a braking capability of the vehicle, a preferred travel distance ahead of the vehicle, and a preferred driving speed ahead of the vehicle. A length of the speed profile or a speed profile period through which the speed profile can operate, in one exemplary embodiment, can be selected based upon the preferred travel distance ahead, through which desired motion of the vehicle can be predicted and as determined by the system sensors and V2X communication. The speed profiles are transmitted on the CAN bus for example, and when received by motor controllers, have sufficient number of future speed commands to drive the vehicle even if there is a communication anomaly.

Such a fail-safe system, utilizing speed profiles to cover for communication anomalies, can increase fuel economy by smooth regulation of vehicle speed, and reduction in vehicle stoppages, maintain desirable autonomous operation during times when CAN communication is delayed, temporarily lost or CAN bus is busy, increase vehicle drivability by reducing speed variation in autonomous operation, and improve travel time by reducing the number of vehicle stoppages due to data communication delays. FIG. 24 graphically depicts exemplary speed profiles that can be utilized in the event of communication anomalies, in accordance with the present disclosure.

Data exchange between an autonomous controller and motor controller system encompasses the former sending or communicating a control message including desired speeds and steering commands periodically to the latter and the latter execute these commands in its own control loops. This arrangement assumes reliable communication medium between the two subsystems (often CAN, Profibus, FlexRay, Fieldbus, Ethernet, Serial etc.). Reduced vehicle speeds (e.g., percentage reduction of the desired vehicle speed) may be used as a mitigation measure by the platform motor controller for situations where this communication is not reliable. Such situations may eventually leaders to a "Communication Anomaly" state for the system after a pre-determined timeout period, and at that time the only option would be to stop the vehicle to mitigate the risk of collisions. This may lead to frequent but temporarily system down-times during autonomous operation, a condition which may be handled by maintaining larger communication timeout threshold periods.

FIG. 40 schematically depicts operation of an autonomous system architecture diagram, including operation of a remotely operated portable navigation device communicating commands to the vehicle control systems, in accordance with the present disclosure. The autonomous system architecture 600 depicted augments operation of the exemplary system described in FIG. 16, including autonomous controller 410, a motor controller 430, a GPS device 135, and a DSRC system 440, with additional components described including a manual drive system 610, allowing operator control of the vehicle; a vehicle interface module 620, including communications devices; and a portable navigation device 630 in communication with the vehicle interface module 620. Additionally, commands between various components of the system is accomplished through a CAN. One having ordinary skill in the art will appreciate that signals commonly occurring over the CAN include motion commands: speed profiles, steering/yaw rate; vehicle signals: current speed, longitudinal acceleration, lateral acceleration, yaw rate, brake status, wheel speeds, wheel positions, and battery voltage; and system signals including communicative heartbeats. Additionally, an ethernet connection is described between vehicle interface module 620 and autonomous controller 410. There are two main control commands generated by autonomous control system namely the "Speed Profile" command for vehicle longitudinal speed control, and the "Steering/Yaw Rate" command for vehicle lateral steering control. These two CAN commands periodically transmit as CAN messages from the autonomous controller 410 at every 50 milliseconds (or higher rate) to the motor controller 430.

"Speed" and "Yaw Rate" commands are used for speed and steering control of autonomous vehicles. If CAN bus communication is reliable one can reliably control the vehicle platform using these commands. If for some reason the CAN communication is delayed (bus-off situation) or lost due to packet collisions on the CAN bus, there can be time periods in motor controller 430 that have no valid speed commands to execute. Some reduced speed (e.g., percentage reduction of vehicle speed) may be used as a mitigation measure by the platform motor controller in such situations. This may eventually lead to a "CAN bus communication error" after a pre-determined timeout period, and at that time the vehicle should be stopped to mitigate the risk of collisions. As described above, such a communications anomaly can be controlled using speed commands and speed profiles according to the methods described herein.

FIG. 41 depicts exemplary speed profile data that can be utilized in order to execute a desirable slowing or stopping maneuver, in accordance with the present disclosure. The speed profile data in the CAN control message is intended to provide a set of speeds that the platform motor control system will execute while the "CAN message data delay" (heartbeat delay) is detected. The "Length of Speed Profile" field will contain a distance value that the Autonomous Control Subsystem has confirmed (according to all of its available information) to be clear to traverse. The speed changes defined in the "Speed delta_1" through "Speed delta_4" fields, which will normally be defined in a way that desirably brings the vehicle to a halt at any point in the vehicle's motion, shall be executed under the heartbeat delay time. The different speed delta values could be interpreted by the platform motor controllers as below (not just limited to following numerical numbers). The CAN Speed Profile control message may indicate any values determined appropriate. Exemplary values are described in the following examples:

"Command Speed"=10.0 m/s;

"Length of Speed_Profile"=50 m;

"Speed delta_1"=−1.5 m/s (the desired vehicle speed at 12.5 m distance is 8.5 m/s);

"Speed delta_2"=−3.0 m/s (the desired vehicle speed at 25.0 m distance is 7.0 m/s);

"Speed delta 3"=−7.0 m/s (the desired vehicle speed at 37.5 m distance is 3.0 m/s); and "Speed delta 4"=−10.0 m/s (the desired vehicle speed at 50.0 m distance is 0.0 m/s).

Methods described herein can work in areas wherein manually operated vehicles not controlled in platoons and automatically operated vehicles controlled in platoons are driven together on the same road in the same lanes. However, it will be appreciated that a number of advantages are present if traffic on the road can be limited to automated vehicles, as reactions to unpredictable driver responses can be disruptive to efficient operation of automatically controlled vehicles. Ranges in mixed traffic are desirably extended to maintain enhanced driving experiences in light of unpredictable behavior on the road by manually operated vehicles.

Formations described above describe a Leader Vehicle in control of the creation and operation of a platoon. This vehicle is depicted in a forwardmost location of the formation, in order to take full advantage of the benefits of having a single vehicle making perceptions regarding the navigation of the platoon and simply communicating to the other vehicles in the platoon navigation commands to remain in a desirable formation. However, it will be appreciated that the Leader Vehicle need not be in the forwardmost spot in the formation. In such an instance, sensor inputs from a vehicle in the forwardmost position in the platoon could be transmitted with either no or minimal processing to the Leader Vehicle. In the alternative, the forwardmost vehicle could be delegated some responsibility of determining a desirable path by the Leader Vehicle, thereby reducing a complexity of the communication between the forwardmost vehicle and the Leader Vehicle, with the Leader Vehicle still maintaining control over the formation and ranges necessary to maintain desirable operation of the formation. Such a system could be employed by a manually operated forwardmost vehicle with detailed instructions from the Leader Vehicle going to the driver of the forwardmost vehicle. In the alternative, tasks usually performed by the Leader Vehicle could be split, for example, with sensor inputs and formation management going to a forwardmost vehicle with route planning, waypoint management, and similar functions being retained by any other vehicle in the formation. A number of alternative methods to manage roles within the formation are envisioned, and the disclosure is not intended to be limited to the particular exemplary embodiments described herein.

This disclosure has described new control methods capable of being utilized with known vehicle configurations with standard wheel configurations. However, it will be appreciated that, in particular in urbanized settings, smaller vehicles with unconventional, shortened wheel bases, in particular in dedicated lanes allowing travel only of similar vehicles, can be advantageous to the traffic density and unconventional energy storage solutions described above. It will be appreciated that the methods and systems described herein can be optimized for use with smaller, more nimble vehicles with different powertrains, different wheel configurations, and different vehicle control methods.

Throughout the disclosure, wireless communication is described providing vehicle positions or trajectories, for example, as determined by global positioning devices. It will be appreciated that exemplary global positioning devices provide a position of the device including a latitude position, a longitude position, and an altitude. It will be appreciated that a heading that the device is traveling can be easily provided or communicated based upon plotting progression of positions of the device over time. Further, either by similar plotting of positions of the device or by other sensors known in the art, longitudinal acceleration/braking and lateral acceleration can be readily determined or communicated. Further, a path history describing a path taken by a vehicle can be communicated, for example, to describe an acceptable path of travel or to define relative paths for Follower Vehicles. Further, a travel plan including map waypoints or other information can be communicated. Further, information describing operating behaviors of the vehicle can be communicated, including vehicle size, vehicle load, vehicle type, and current operating mode (autonomous, semi-autonomous, manual, etc.). Further information regarding operation of a platoon of which the vehicle is a participant can be communicated. Information communicated within wireless communication between vehicles and infrastructure can take many forms, and the disclosure is not intended to be limited to the particular exemplary embodiments described herein.

In controlling the Leader Vehicle of a platoon or in unitary vehicle control, a vehicle can be directed according to segments of a current plan. The vehicle chooses a closest point of the current plan segment. The closest or the target point or objective on the intended path needs to be selected based upon a look ahead time (at least a distance of the look ahead time (e.g., 0.4 sec) times a vehicle speed) ahead of the current location as projected onto the planned path. A difference between a current yaw and a current direction of the target point relative to the vehicle's center point is used to determine a command yaw rate. If the absolute value of the difference is greater than a yaw threshold, a coarse approach can be used.

An exemplary yaw threshold is 0.5 deg. A course approach can be described by the exemplary following equations.

$$R_{n1} = \frac{n}{2*\sin\varphi} \quad [6]$$

$$\theta_{n1} = \frac{v_{n1}}{R_{n1}} = \frac{2*v_{n1}*\sin\varphi}{n} \quad [7]$$

R describes a turning radius for the vehicle being controlled. Theta_dot describes a yaw rate needed to maneuver the vehicle towards a next path objective position. φ describes a yaw angle of the vehicle. Theta_dot and φ describe yaw rate and yaw of the vehicle, respectively. In some embodiments, theta_dot and φ can be in the same reference space, and in others they can be in different reference spaces. n is a straight-line distance from the current location of the vehicle to the next objective. v equals the speed of the vehicle being controlled.

For small angular differences, a fine steering approach can be utilized, as described by the exemplary following equations.

$$R_{n2} = \frac{abc}{\sqrt{2a^2b^2 + 2b^2c^2 + 2c^2a^2 - a^4 - b^4 - c^4}} \quad [8]$$

$$\theta_{n2} = \frac{v_{t1}}{R_{n2}} = \frac{v_{t1}\sqrt{2a^2b^2 + 2b^2c^2 + 2c^2a^2 - a^4 - b^4 - c^4}}{abc} \quad [9]$$

Equations 8 and 9 utilize projections of two objectives on a projected path in front of the vehicle being controlled at two times (ex., t1=0.2 seconds and t2=0.4 seconds). a equals a straight line distance from the current location of the vehicle to the first objective at time t1. b equals a straight line distance from the current location of the vehicle to the first objective at time t2. c equals a straight line distance between the first objective and the second objective. $v_{t1}$ equals the projected velocity of the vehicle at the first objective.

Control of a Follower Vehicle can be accomplished similarly. Equations utilizing look ahead time to project in front of the current position of the vehicle can be utilized. Then, the steering target point is found by laterally offsetting from the determined look-ahead point by the distance defined within the platoon formation geometry as transmitted from the Leader Vehicle. These exemplary control methods of leader, unitary, and follower are examples of methods to control vehicles according to the methods described herein. However a number of exemplary control methods are envisioned, and the disclosure is not intended to be limited to the particular examples described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a vehicle upon a roadway comprising:
   monitoring a trajectory of a host vehicle based upon a global positioning device within the host vehicle;
   monitoring a first wireless communication between the host vehicle and a plurality of target vehicles, said first wireless communication comprising a respective trajectory of each of the target vehicles based upon a respective global positioning device within each of the target vehicles;
   determining navigational commands for the host vehicle based upon the trajectory of the host vehicle and the trajectory of each of the target vehicles; and
   operating the host vehicle based upon the navigational commands.

2. The method of claim 1, wherein the host vehicle is operated unitarily with all of the determined navigational commands being determined within the host vehicle.

3. The method of claim 1, further comprising monitoring a second wireless communication comprising traffic commands from an infrastructure device; and
   wherein determining navigational commands for the host vehicle is further based upon the traffic commands.

4. The method of claim 3, wherein the host vehicle is operated proximate a traffic intersection; and
   wherein the traffic commands comprise commands to navigate the traffic intersection.

5. The method of claim 3, wherein the infrastructure device monitors the roadway for obstructions; and
   wherein determining navigational commands for the host vehicle is further based upon avoiding the obstructions.

6. The method of claim 3, wherein the infrastructure device monitors the roadway for pedestrians; and
   wherein determining navigational commands for the host vehicle is further based upon avoiding the pedestrians.

7. The method of claim 3, wherein the infrastructure device generates a global positioning device localizer signal; and
   wherein determining navigational commands for the host vehicle is further based upon the global positioning device localizer signal.

8. The method of claim 1, further comprising monitoring a planned travel route; and
   wherein determining navigational commands for the host vehicle is further based upon the planned travel route.

9. The method of claim 8, further comprising:
   monitoring a requested destination for the planned travel route; and
   determining the planned travel route based upon the global positioning device within the host vehicle, the requested destination of the planned travel route, and a digital map database.

10. The method of claim 8, wherein the planned travel route is communicated from another vehicle.

11. The method of claim 1, wherein said first wireless communication further comprises a request to form a platoon of vehicles;
    the method further comprising accepting the request to form a platoon of vehicles; and
    wherein determining navigational commands for the host vehicle is further based upon commands from a leader vehicle of the platoon of vehicles.

12. The method of claim 1, wherein said first wireless communication further comprises a commanded position communicated from a leader vehicle of a platoon of vehicles; and
    wherein determining navigational commands for the host vehicle is further based upon the commanded position.

13. The method of claim 12, wherein monitoring the first wireless communication further comprises:
    monitoring a path history of the leader vehicle;

monitoring a formation definition of the platoon of vehicles;

monitoring position assignments of the platoon of vehicles;

monitoring navigational goals of the platoon of vehicles;

monitoring detailed motion coordination guidance of the platoon of vehicles;

monitoring a heard from list of the platoon of vehicles; and monitoring formation management protocol messages of the platoon of vehicles.

14. The method of claim 12, wherein the commanded position comprises a global positioning coordinate.

15. The method of claim 12, wherein the commanded position comprises a relative position to a path history of the leader vehicle.

16. The method of claim 12, wherein the host vehicle is not a member of the platoon of vehicles; and
wherein the commanded position comprises initiation of entry of the host vehicle into the platoon of vehicles.

17. The method of claim 12, wherein the host vehicle is a member of the platoon of vehicles; and
wherein the commanded position comprises initiation of exit of the host vehicle from the platoon of vehicles.

18. The method of claim 12, wherein the host vehicle is a member of the platoon of vehicles; and
wherein the commanded position comprises an instruction for the host vehicle to assume a follower position within the platoon.

19. The method of claim 1, wherein the host vehicle is operated in a unitary, autonomous, valet mode navigating without an occupant present in the vehicle.

20. The method of claim 1, wherein the respective trajectory of each of the target vehicles comprises:
a respective position latitude;
a respective position longitude;
a respective altitude; and
a respective heading.

21. The method of claim 20, wherein the respective trajectory of each of the target vehicles further comprises:
a respective longitudinal acceleration and braking;
a respective lateral acceleration
a respective path history;
a respective travel plan;
a respective vehicle size;
a respective vehicle type;
a respective current operating mode; and
respective platoon control data.

22. Method for controlling a vehicle, the method comprising:
monitoring a current vehicle position with a global positioning device within the vehicle;
communicating the current vehicle position through a wireless communication between the vehicle and a remotely located device;
remotely monitoring at said remotely located device an operating environment of the vehicle;
remotely determining at said remotely located device a commanded vehicle position based upon the current vehicle position and the monitored operating environment, said commanded vehicle position comprising a global positioning coordinate;
receiving within the vehicle the commanded vehicle position through the wireless communication; and
controlling the vehicle based upon the commanded vehicle position.

23. The method of claim 22, wherein said remotely located device is located within another vehicle proximate to the vehicle.

24. The method of claim 22, wherein said remotely located device is located within an infrastructure.

25. Method for controlling a plurality of vehicles within a platoon of vehicles, the method comprising:
transmitting from each of the plurality of vehicles a respective current position of the respective vehicle through a respective vehicle-to-vehicle communications device based upon data from a respective global positioning device;
within a leader vehicle selected from the plurality of vehicles:
monitoring a road geometry proximate to the leader vehicle;
determining a desired formation for the platoon comprising determining a plurality of follower positions for the platoon based upon the current position of the leader vehicle and the road geometry; and
assigning a respective one of the plurality of follower positions to each of the plurality of vehicles that is not the leader vehicle; and
controlling each of the plurality of vehicles that is not the leader vehicle based upon the respective assigned follower position and the respective current position.

26. The method of claim 25, further comprising:
within the leader vehicle, generating a respective commanded position for each of the plurality of vehicles that is not the leader vehicle based upon the respective current position and the respective assigned follower position; and
wherein controlling each of the plurality of vehicles that is not the leader vehicle based upon the respective assigned follower position comprises controlling based upon the respective commanded position.

27. The method of claim 25, wherein controlling each of the plurality of vehicles that is not the leader vehicle based upon the respective assigned follower position comprises autonomously controlling each of the plurality of vehicles that is not the leader vehicle based upon the respective assigned follower position and the respective current position.

28. The method of claim 25, further comprising:
within the lead vehicle:
monitoring a request to join the platoon from a vehicle not within the platoon;
determining a condition to allow the vehicle not within the platoon to join the platoon;
determining a new follower position based upon the desired formation for the platoon; and
assigning the new follower position to the vehicle not within the platoon based upon the condition.

29. The method of claim 25, further comprising:
within the lead vehicle:
monitoring a request for a follower position reassignment from one of the plurality of vehicles that is not the leader vehicle;
determining a suggested follower position for the one of the plurality of vehicles that is not the leader vehicle requesting said follower position reassignment;
monitoring an acceptance of the suggested follower position from the one of the plurality of vehicles that is not the leader vehicle requesting said follower position reassignment;
assigning the suggested follower position to the one of the plurality of vehicles that is not the leader vehicle requesting said follower position reassignment based upon the acceptance of the suggested follower position; and controlling the one of the plurality of vehicles that is not the leader vehicle requesting said follower position reassignment based upon the suggested follower position.

30. The method of claim 25, further comprising:
within the lead vehicle:
monitoring a request to leave the platoon from one of the plurality of vehicles that is not the leader vehicle; and
generating commands to each of the plurality of vehicles that is not the leader vehicle to enable the one of the plurality of vehicles that is not the leader vehicle requesting to leave the platoon to leave the platoon.

31. The method of claim 25, further comprising:
within the leader vehicle:
monitoring a command for the leader vehicle to leave the platoon;
monitoring a respective leadership ambition level of each of the plurality of vehicles that is not the leader vehicle;
providing a nomination of one of the plurality of vehicles that is not the leader vehicle as a new leader vehicle based upon the leadership ambition levels;
monitoring an acceptance of the nomination by the nominated one of the plurality of vehicles; and
changing control of the leader vehicle to a unitary vehicle control based upon the acceptance of the nomination by the nominated one of the plurality of vehicles; and
within the nominated one of the plurality of vehicles, assuming control of the platoon.

32. The method of claim 25, further comprising:
within the leader vehicle:
monitoring a command for the leader vehicle to relinquish leadership;
monitoring a leadership ambition level of each of the plurality of vehicles that is not the leader vehicle;
providing a nomination of one of the plurality of vehicles that is not the leader vehicle as a new leader vehicle based upon the leadership ambition levels; and
monitoring an acceptance of the nomination by the nominated one of the plurality of vehicles; and
within the nominated one of the plurality of vehicles, assuming control of the platoon.

33. The method of claim 25, further comprising:
within the lead vehicle:
monitoring a request to assume leadership from one of the of the plurality of vehicles that is not the leader vehicle;
monitoring a leadership ambition level of the one of the of the plurality of vehicles that is not the leader vehicle requesting to assume leadership;
comparing the monitored leadership ambition level of the one of the of the plurality of vehicles that is not the leader vehicle requesting to assume leadership to a leadership ambition level of the leader vehicle; and
relinquishing leadership of the platoon to the one of the of the plurality of vehicles that is not the leader vehicle requesting to assume leadership based upon the comparing.

34. The method of claim 25, further comprising:
within one of the of the plurality of vehicles that is not the leader vehicle:
monitoring occurrence of a gap in communications between the leader vehicle and the plurality of vehicles that is not the leader vehicle;
monitoring a time period of the gap in communications;
when the time period of the gap in communications exceeds a threshold gap in communications, communicating a leadership request to the platoon;
monitoring responses to the leadership request; and
if responses to the leadership request do not include a leadership acceptance, generating a leadership self-nomination and assuming control of the platoon.

35. The method of claim 25, further comprising:
within the lead vehicle:
monitoring a command to dissolve the platoon;
generating an imminent expiration message to each of the plurality of vehicles that is not the leader vehicle; and
dissolving the platoon; and
operating each of the plurality of vehicles under a unitary vehicle control.

36. The method of claim 25, further comprising:
determining a path history of the leader vehicle; and
wherein determining the plurality of follower positions for the platoon is further based upon the path history of the lead vehicle.

37. The method of claim 36, wherein determining the plurality of follower positions for the platoon based upon the path history of the lead vehicle comprises defining the plurality of follower positions for the platoon as relative positions to the path history of the lead vehicle.

38. The method of claim 26, further comprising monitoring a position of an object proximate the platoon of vehicles; and
wherein controlling each of the plurality of vehicles that is not the leader vehicle is further based upon the monitored position of the object proximate the platoon of vehicles.

39. The method of claim 38, wherein determining the desired formation for the platoon comprising determining the plurality of follower positions for the platoon is further based upon the monitored position of the object proximate the platoon of vehicles.

* * * * *